United States Patent
Ueda

(10) Patent No.: US 8,244,059 B2
(45) Date of Patent: Aug. 14, 2012

(54) IMAGE PROCESSING METHOD, APPARATUS, RECORDING MEDIUM, AND IMAGE PICKUP APPARATUS

(75) Inventor: Tooru Ueda, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 1069 days.

(21) Appl. No.: 12/170,618

(22) Filed: Jul. 10, 2008

(65) Prior Publication Data
US 2009/0016639 A1    Jan. 15, 2009

(30) Foreign Application Priority Data

Jul. 13, 2007   (JP) ................................ 2007-184826

(51) Int. Cl.
G06K 9/40    (2006.01)
G06K 9/00    (2006.01)
(52) U.S. Cl. ...................................... 382/275; 382/118
(58) Field of Classification Search .................. 382/118, 382/167, 181, 254, 275, 300, 190
See application file for complete search history.

(56) References Cited

U.S. PATENT DOCUMENTS

| | | | |
|---|---|---|---|
| 4,825,297 A | | 4/1989 | Fuchsberger et al. |
| 5,335,312 A | * | 8/1994 | Mekata et al. ............... 704/202 |
| 7,254,276 B2 | * | 8/2007 | Sugimoto et al. ............ 382/250 |
| 7,529,425 B2 | * | 5/2009 | Kitamura et al. ............ 382/275 |
| 7,586,525 B2 | * | 9/2009 | Tamaru et al. ............... 348/241 |
| 2005/0141778 A1 | | 6/2005 | Nakajima et al. |
| 2006/0257047 A1 | * | 11/2006 | Kameyama et al. .......... 382/275 |
| 2007/0041640 A1 | | 2/2007 | Tabata et al. |
| 2007/0071347 A1 | | 3/2007 | Li et al. |

FOREIGN PATENT DOCUMENTS

| | | |
|---|---|---|
| JP | 63-59266 A | 3/1988 |
| JP | 9-233423 A | 9/1997 |
| JP | 11-339035 A | 12/1999 |
| JP | 2004-303193 A | 10/2004 |
| JP | 2005-196270 A | 7/2005 |
| JP | 2007-87234 A | 4/2007 |
| JP | 2008-258830 A | 10/2008 |

OTHER PUBLICATIONS

Explanation of Circumstances Concerning Accelerated Examination, dated Sep. 9, 2010, for Japanese Application No. 2007-184826.
Notice of Reasons for Rejection, dated Sep. 29, 2010, for Japanese Application No. 2007-184826.

* cited by examiner

*Primary Examiner* — Daniel Mariam
(74) *Attorney, Agent, or Firm* — Birch, Stewart, Kolasch & Birch, LLP

(57) ABSTRACT

The noise reduction process is appropriately changed according to a proportion of the facial region in an angle of view, thereby minimizing deterioration of background resolution as well as removing wrinkles and blemishes in the facial region.

26 Claims, 29 Drawing Sheets

IMAGE AFTER SKIN TONE IMPROVEMENT PROCESS

IMAGE AFTER SKIN TONE IMPROVEMENT PROCESS

FIG.13

|  | LARGE FACE | SMALL FACE |
|---|---|---|
| HIGH FREQUENCY | HIGH REDUCTION EFFECT | HIGH REDUCTION EFFECT |
| MEDIUM FREQUENCY | HIGH REDUCTION EFFECT | MEDIUM REDUCTION EFFECT |
| LOW FREQUENCY | HIGH REDUCTION EFFECT | LOW REDUCTION EFFECT |

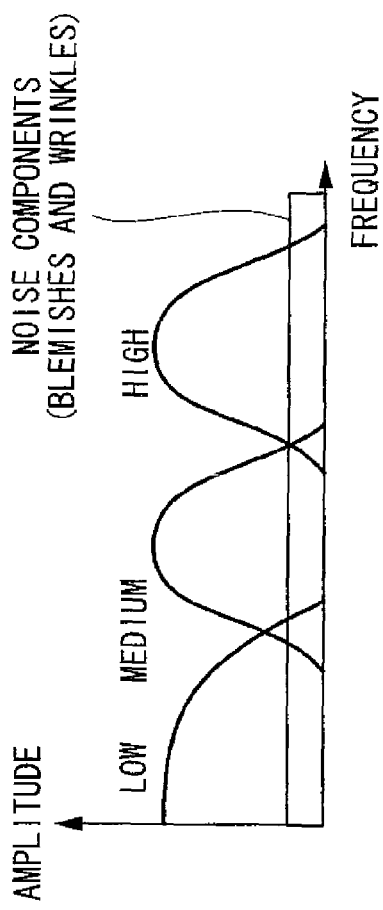
FIG.14B
FIG.14C
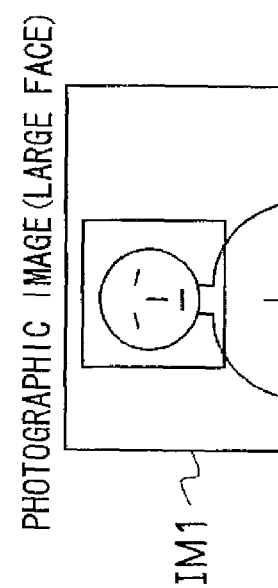
FIG.14A

FIG.18

|  | LARGE FACE | SMALL FACE |
|---|---|---|
| HIGH FREQUENCY | HIGH REDUCTION EFFECT | HIGH REDUCTION EFFECT |
| MEDIUM FREQUENCY | HIGH REDUCTION EFFECT | MEDIUM REDUCTION EFFECT |
| LOW FREQUENCY | HIGH REDUCTION EFFECT | LOW REDUCTION EFFECT |

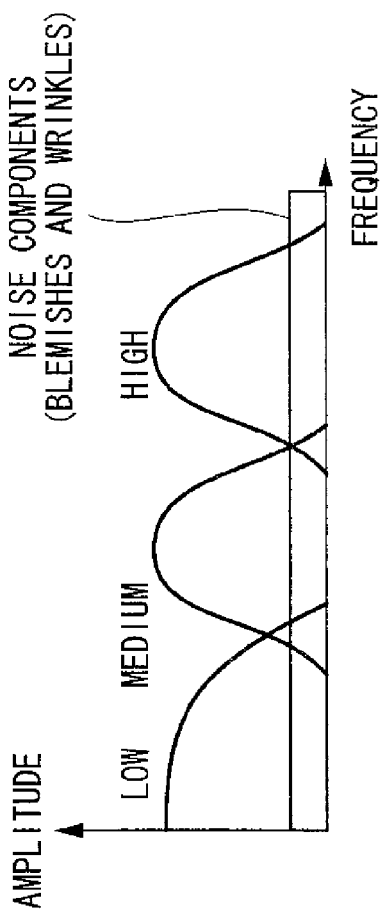
FIG.19B
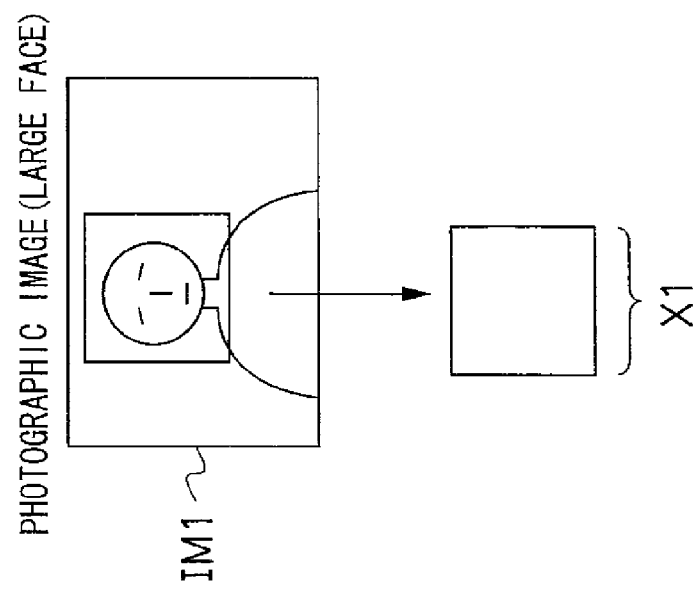
FIG.19C
FIG.19A

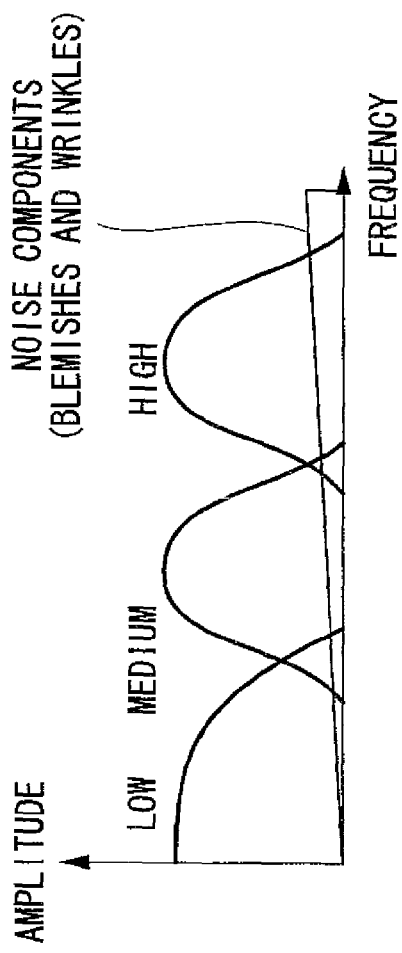
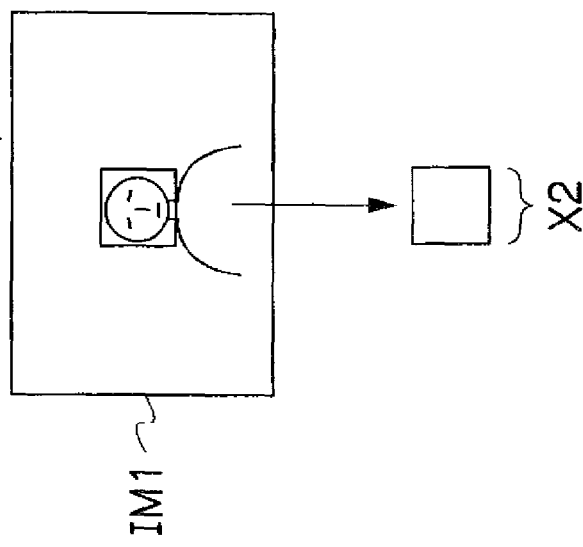

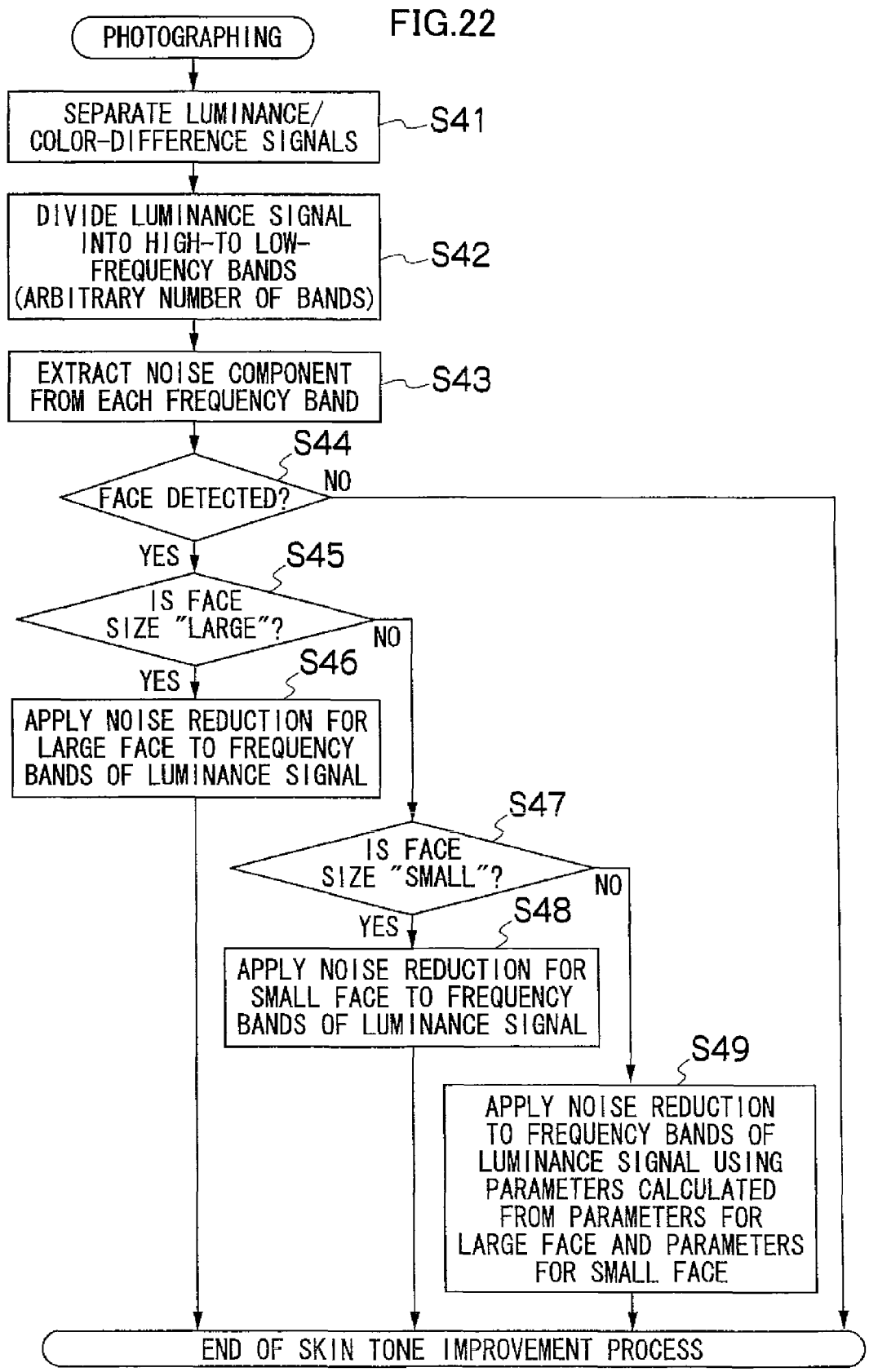

FIG.23

| RATIO OF HORIZONTAL WIDTH OF FACE TO HORIZONTAL WIDTH OF ENTIRE IMAGE | FACE SIZE DECISION |
|---|---|
| 7/8 OR ABOVE | LARGE |
| 1/8 OR ABOVE AND LESS THAN 7/8 | MEDIUM |
| LESS THAN 1/8 | SMALL |

FIG.24

|  | LARGE FACE | SMALL FACE |
|---|---|---|
| HIGH FREQUENCY | HIGH REDUCTION EFFECT | HIGH REDUCTION EFFECT |
| MEDIUM FREQUENCY | HIGH REDUCTION EFFECT | MEDIUM REDUCTION EFFECT |
| LOW FREQUENCY | HIGH REDUCTION EFFECT | LOW REDUCTION EFFECT |

FIG.25

|  | LARGE FACE | SMALL FACE |
|---|---|---|
| HIGH FREQUENCY | Y_BL_H | Y_BS_H |
| MEDIUM FREQUENCY | Y_BL_M | Y_BS_M |
| LOW FREQUENCY | Y_BL_L | Y_BS_L |

FIG.28

| RATIO OF HORIZONTAL WIDTH OF FACE TO HORIZONTAL WIDTH OF ENTIRE IMAGE | FACE SIZE DECISION |
|---|---|
| 7/8 OR ABOVE | LARGE |
| 1/8 OR ABOVE AND LESS THAN 7/8 | MEDIUM |
| LESS THAN 1/8 | SMALL |

FIG.29

|  | LARGE FACE | SMALL FACE |
|---|---|---|
| HIGH FREQUENCY | HIGH REDUCTION EFFECT | HIGH REDUCTION EFFECT |
| MEDIUM FREQUENCY | HIGH REDUCTION EFFECT | MEDIUM REDUCTION EFFECT |
| LOW FREQUENCY | HIGH REDUCTION EFFECT | LOW REDUCTION EFFECT |

FIG.30

|  | LARGE FACE | SMALL FACE |
|---|---|---|
| HIGH FREQUENCY | C_BL_H | C_BS_H |
| MEDIUM FREQUENCY | C_BL_M | C_BS_M |
| LOW FREQUENCY | C_BL_L | C_BS_L |

IMAGE PROCESSING METHOD, APPARATUS, RECORDING MEDIUM, AND IMAGE PICKUP APPARATUS

BACKGROUND OF THE INVENTION

1. Field of the Invention

The present invention relates to a noise reduction process of an image using a face detecting function.

2. Description of the Related Art

Japanese Patent Application Laid-Open No. 2005-196270 discloses a technique for breaking down signals from pixels in a flesh color region into luminance and color-difference signals, reducing signal strength of pixels in a specific range of the flesh color region through wavelet transform, and thereby removing wrinkles and blemishes.

Japanese Patent Application Laid-Open No. 9-233423 discloses a technique for enhancing edges and changing tones according to a size of a facial region. This makes it possible to separately process a facial region and another region different from the facial region.

SUMMARY OF THE INVENTION

However, with the technique disclosed in Japanese Patent Application Laid-Open No. 2005-196270, if a color of a skin is not in the flesh color region, no blemish removal process is performed With the technique disclosed in Japanese Patent Application Laid-Open No. 9-233423, it takes a lot of processing time to process the two regions separately, resulting in complicated control.

An object of the present invention is to combine wrinkle and blemish removal with high image quality by varying skin tone improvement process (wrinkle and blemish removal process) according to a proportion of a face in an angle of view and thereby minimizing deterioration of background resolution.

An image processing method according to a first aspect of the present invention, comprises the steps of: inputting an image; detecting a facial region in the image; determining a frequency band in which a luminance signal of the image will be subjected to a predetermined noise reduction process based on a size of the detected facial region; extracting the determined frequency band from the luminance signal of the image; and performing the predetermined noise reduction process on the frequency band extracted from the luminance signal of the image.

An image processing method according to a second aspect of the present invention, comprises the steps of: inputting an image; detecting a facial region in the image; determining a frequency band in which a color-difference signal of the image will be subjected to a predetermined noise reduction process based on a size of the detected facial region; extracting the determined frequency band from the color-difference signal of the image; and performing the predetermined noise reduction process on the frequency band extracted from the color-difference signal of the image.

An image processing method according to a third aspect of the present invention, comprises the steps of: inputting an image; separating a luminance signal of the image into a plurality of frequency components according to a plurality of predetermined frequency bands; detecting a facial region in the image; determining a weight for each of the separated frequency components to be subjected to a noise reduction process based on a size of the detected facial region; and performing a predetermined noise reduction process on each of the separated frequency components based on the determined weight for each of the separated frequency components.

An image processing method according to a fourth aspect of the present invention, comprises the steps of: inputting an image; separating a color-difference signal of the image into a plurality of frequency components according to a plurality of predetermined frequency bands; detecting a facial region in the image; determining a weight for each of the separated frequency components to be subjected to a noise reduction process based on a size of the detected facial region; and performing a predetermined noise reduction process on each of the separated frequency components based on the determined weight for each of the separated frequency components.

In addition, when the size of the facial region is an intermediate size between two predetermined sizes of a facial region (face size), i.e., a first size and a second size, a weight for the facial region of the intermediate size may be determined by linear interpolation from weights of the first size and the second size.

An image processing apparatus according to a fifth aspect of the present invention, comprises: an image input unit which inputs an image; a face detecting unit which detects a facial region in the image; a frequency band determining unit which determines a frequency band in which a luminance signal of the image will be subjected to a predetermined noise reduction process based on a size of the detected facial region; a frequency band extracting unit which extracts the determined frequency band from the luminance signal of the image; and a noise reduction processing unit which performs the predetermined noise reduction process on the frequency band extracted from the luminance signal of the image.

An image processing apparatus according to a sixth aspect of the present invention, comprises: an image input unit which inputs an image; a face detecting unit which detects a facial region in the image; a frequency band determining unit which determines a frequency band in which a color-difference signal of the image will be subjected to a predetermined noise reduction process based on a size of the detected facial region; a frequency band extracting unit which extracts the determined frequency band from the color-difference signal of the image; and a noise reduction processing unit which performs the predetermined noise reduction process on the frequency band extracted from the color-difference signal of the image.

An image processing apparatus according to a seventh aspect of the present invention, comprises: an image input unit which inputs an image; a separation unit which separates a luminance signal of the image into a plurality of frequency components according to a plurality of predetermined frequency bands; a face detecting unit which detects a facial region in the image; a weight determining unit which determines a weight for each of the separated frequency components to be subjected to a noise reduction process based on a size of the detected facial region; and a noise reduction processing unit which performs a predetermined noise reduction process on each of the separated frequency components based on the determined weight for each of the separated frequency components.

An image processing apparatus according to an eighth aspect of the present invention, comprises: an image input unit which inputs an image; a separation unit which separates a color-difference signal of the image into a plurality of frequency components according to a plurality of predetermined frequency bands; a face detecting unit which detects a facial region in the image; a weight determining unit which determines a weight for each of the separated frequency components to be subjected to a noise reduction process based on a size of the detected facial region; and a noise reduction processing unit which performs a predetermined noise reduction process on each of the separated frequency components based on the determined weight for each of the separated frequency components.

An image processing program which makes a computer perform any of the image processing methods described above can also achieve the object of the present invention. In addition, a recording medium on which the image processing program is stored can also achieve the object of the present invention by causing a computer on which the program is installed to execute the program.

Further, an image pickup apparatus which can achieve the object of the present invention can also be realized, and the image pickup apparatus comprises: any one of the image processing apparatus described above; an image pickup element which receives a subject image via a photographic optical system and outputs an analog image signal that represents the subject image; and an image output unit which converts the analog image signal into a digital image data and outputs the digital image data to the image input unit. The image pickup apparatus can also achieve the object of the present invention.

According to the any one of the aspects of the present invention, by varying the level of noise reduction according to the size of the facial region, improvement of skin tones of human subjects can be achieved while maintaining background image quality.

BRIEF DESCRIPTION OF THE DRAWINGS

FIG. 13 is a diagram showing an example of a weight table according to the third embodiment;

FIG. 14A is a diagram showing an example of an image including a large facial region;

FIG. 14B is a diagram showing an example of frequency characteristics of a luminance signal divided into three frequency bands;

FIG. 14C is a diagram showing an example of a weight table for an image including a large facial region;

FIG. 15C is a diagram showing an example of a weight table for an image including a small facial region;

FIG. 18 is a diagram showing an example of a weight table according to the fourth embodiment;

FIG. 19A is a diagram showing an example of an image including a large facial region;

FIG. 19B is a diagram showing an example of frequency characteristics of a color-difference signal divided into three frequency bands;

FIG. 19C is a diagram showing an example of a weight table for an image including a large facial region;

FIG. 20A is a diagram showing an example of an image including a small facial region;

FIG. 20B is a diagram showing an example of frequency characteristics of a color-difference signal divided into three frequency bands;

FIG. 20C is a diagram showing an example of a weight table for an image including a small facial region;

FIG. 22 is a flowchart of a skin tone improvement process according to the fifth embodiment;

FIG. 23 is a diagram showing an example of a face size determination table according to the fifth embodiment;

FIG. 24 is a diagram showing an example of a weight table according to the fifth embodiment;

FIG. 25 is a diagram showing an example of a parameterized weight table according to the fifth embodiment;

FIG. 28 is a diagram showing an example of a face size determination table according to the sixth embodiment;

FIG. 29 is a diagram showing an example of a weight table according to the sixth embodiment; and FIG. 30 is a diagram showing an example of a parameterized weight table according to the sixth embodiment.

DETAILED DESCRIPTION OF THE PREFERRED EMBODIMENTS

First Embodiment

Figure 1:
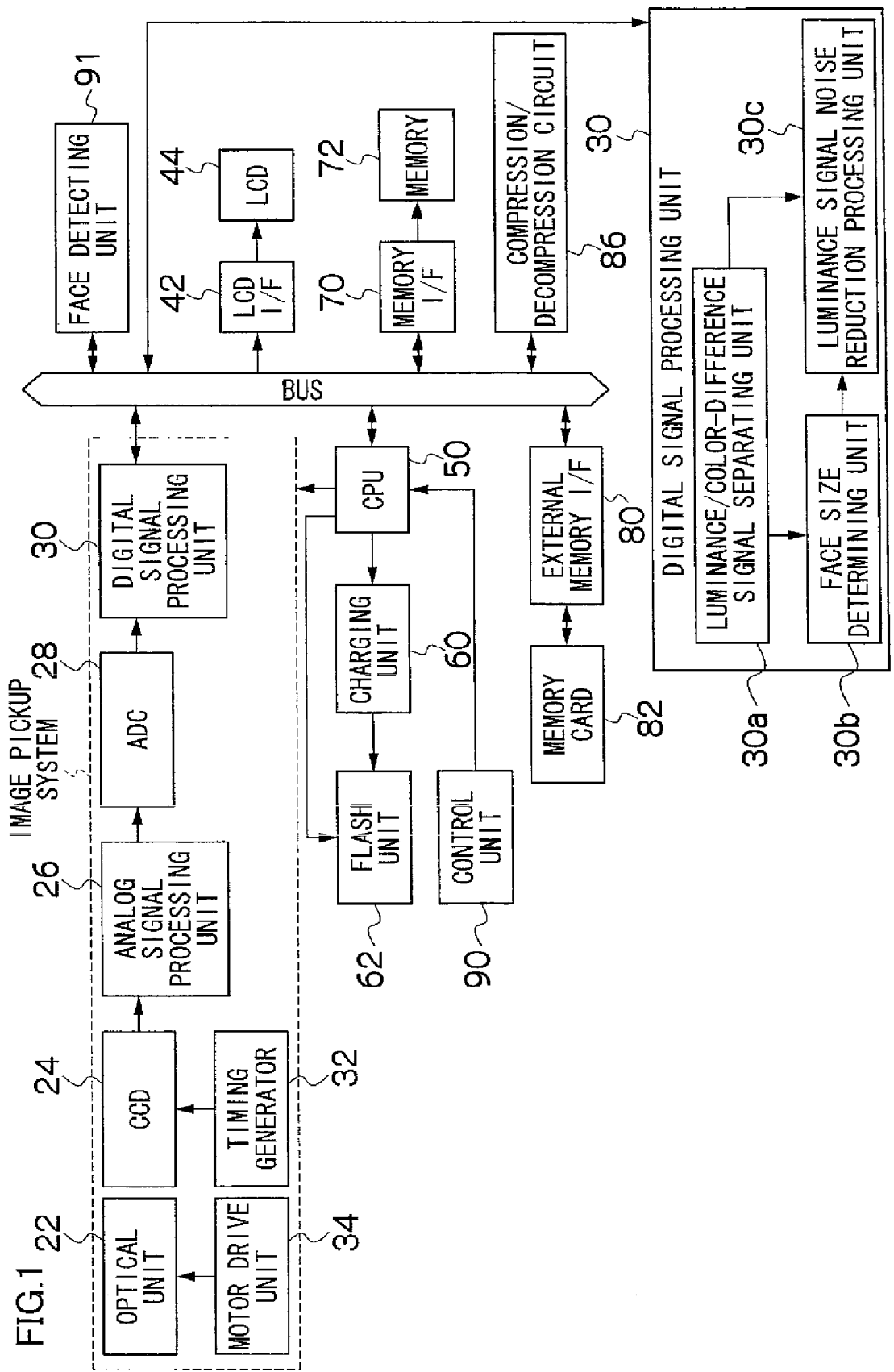
FIG. 1 is a diagram showing an electrical configuration of a digital camera and detailed configuration of a digital signal processing unit according to a first embodiment.

FIG. 1 shows an electrical configuration of a digital camera 10. As shown in FIG. 1, the digital camera 10 comprises: an optical unit 22 which includes a lens; a CCD 24 disposed behind an optical axis of the lens; an analog signal processing unit 26 which includes a correlated double sampling circuit (hereinafter referred to as a "CDS"); an analog/digital converter (hereinafter referred to as an "ADC") 28 which converts an inputted analog signal into digital data; and an digital signal processing unit 30 which incorporates a line buffer of predetermined capacity, directly stores inputted digital image data in a predetermined area of a memory 72 described later, and performs various types of image processing on the digital image data. An output terminal of the CCD 24 is connected to an input terminal of the analog signal processing unit 26, an output terminal of the analog signal processing unit 26 is connected to an input terminal of the ADC 28, and an output terminal of the ADC 28 is connected to an input terminal of the digital signal processing unit 30.

A correlated double sampling process performed by the CDS involves obtaining accurate pixel data by finding the difference between the level of a feed-through component and level of a pixel signal component contained in the output signal of each pixel of a solid-state image pickup element to reduce noise (especially, thermal noise) and the like contained in an output signal of the solid-state image pickup element.

Also, the digital camera 10 includes an LCD interface 42 which generates and supplies signals to an LCD 44 in order for the LCD 44 to display images from digital image data, menu screens, and the like; a CPU (central processing unit) 50 which controls operation of the digital camera 10 as a whole; a memory 72 made up of a VRAM (Video RAM) which stores digital image data mainly obtained by photography; a memory interface 70 which controls access to the memory 72; an external memory interface 80 which allows the digital camera 10 to access a memory card 82 made up of Smart Media™, and a compression/decompression circuit 86 which compresses digital image data in a predetermined compression format and decompresses compressed digital image data according to the compression format of the given digital image data.

The digital signal processing unit 30, LCD interface 42, CPU 50, memory interface 70, external memory interface 80, and compression/decompression circuit 86 are interconnected via a system bus BUS. Thus, the CPU 50 can control operation of the digital signal processing unit 30 and compression/decompression circuit 86, display various types of information on the LCD 44 via the LCD interface 42, and access the memory 72 and memory card 82 via the memory interface 70 and external memory interface 80, respectively.

Also, the digital camera 10 includes a timing generator 32 which generates a timing signal mainly used to drive the CCD 24 and supplies the timing signal to the CCD 24, which is driven by the timing generator 32 under the control of the CPU 50.

Furthermore, the digital camera 10 includes a motor drive unit 34 which drives a focus adjustment motor, zoom motor, and diaphragm drive motor of the optical unit 22 under the control of the CPU 50.

That is, a lens 21 of the optical unit 22 according to the present embodiment is a zoom lens, which, being made up of multiple lenses, is capable of changing focal length (zooming) and equipped with a lens drive mechanism (not shown). The focus adjustment motor, zoom motor, and diaphragm drive motor are included in the lens drive mechanism and driven by a drive signal supplied from the motor drive unit 34, under the control of the CPU 50.

To change an optical zoom factor, the CPU 50 changes the focal length of the lens 21 included in the optical unit 22 by controlling driving of the zoom motor.

Also, the CPU 50 performs focus control by controlling driving of the focus adjustment motor to maximize contrast value of an image obtained through image pickup by the CCD 24. That is, the digital camera 10 according to the present embodiment uses a so-called TTL (Through The Lens) metering for focus control, where the TTL metering involves setting position of the lens so as to maximize the contrast of the captured image.

Furthermore, the CPU 50 is connected with various switches and buttons including a release button, power switch, mode selector switch, cross-key pad, forced-flash button (collectively referred to as "control unit 90"). The CPU 50 keeps track of operating status of the control unit 90.

Also, the digital camera 10 includes a charging unit 60 which, being interposed between flash unit 62 and CPU 50, charges the flash unit 62 for firing under the control of the CPU 50. Furthermore, the flash unit 62 is also connected to the CPU 50, which controls the firing of the flash unit 62.

A lens drive function of the optical unit 22, the CCD 24, the timing generator 32, and the motor drive unit 34 correspond to the image pickup device according to the present invention; the analog signal processing unit 26, ADC 28, and digital signal processing unit 30 correspond to the signal processing device according to the present invention; the flash unit 62 corresponds to the flashing device according to the present invention; the charging unit 60 corresponds to the charging device according to the present invention; and the CPU 50 corresponds to the intermittent operating device according to the present invention.

A face detecting unit 91 identifies a facial region in digital image data in the memory 72, where the facial region contains the facial portion of a person. Available methods for detecting the facial region include, for example, a technique disclosed in Japanese Patent Application Laid-Open No. 2007-124112 filed by the present inventor.

That is, the face detecting unit 91 reads image data P0' of a photographic image and detects a facial portion P0f' in the image P0'. Specifically, as described in Japanese Patent Application Laid-Open No. 2005-108195, it is conceivable to input first feature values which represent directions of gradient vectors which in turn represent the directions and magnitudes of edges of pixels in the image P0' into a plurality of first classifiers and thereby determine whether there is a candidate for a facial region in the image P0', extract any candidate for a facial region, normalize the magnitudes of the gradient vectors of the pixels in the extracted candidate for a facial region, input second feature values which represent the magnitudes and directions of the normalized gradient vectors into second classifiers, and thereby determine whether the extracted candidate for a facial region is an actual facial region, and extract the region as a facial portion P0f' if the region is determined to be an actual facial region. The first and second classifiers are obtained by a learning process using an AdaBoost or other machine learning technique which uses, as inputs, the first and second feature values calculated on an image-by-image basis for a plurality of images known to be faces capable of serving as learning samples and a plurality of images known to be non-faces.

Available methods for detecting a facial portion P1f include, flesh color detection, knowledge base, characteristic extraction, template matching, graph matching, statistical (neural network, SVM, or HMM), and other known techniques in addition to a method which uses correlation scores between intrinsic facial expressions and images Application No. 2004-527863.

As shown in FIG. 1, the digital signal processing unit 30 includes: a luminance/color-difference signal separating unit 30a; face size determining unit 30b; and luminance signal noise reduction processing unit 30c. These functions will be described later.

Next, overall operation of the digital camera 10 during photography will be described briefly.

Signals which represent a subject image outputted from the CCD 24 as a result of image pickup via the optical unit 22 is inputted in the analog signal processing unit 26 in sequence, subjected to an analog signal processing such as a correlated double sampling process, and inputted in the ADC 28. The ADC 28 converts R (red), G (green), and B (blue) signals received from the analog signal processing unit 26 into 12-bit R, G, and B signals (digital image data) and outputs the digital signals to the digital signal processing unit 30.

The digital signal processing unit 30 accumulates the digital image data received in sequence from the ADC 28 in the built-in line buffer and once stores the digital image data in a predetermined area of the memory 72.

The digital image data stored in the predetermined area of the memory 72 is read out by the digital signal processing unit 30 under the control of the CPU 50. Then, the digital image data is subjected to white balance adjustment, gamma processing, and sharpness processing and thereby converted into 8-bit digital image data, where to make the white balance adjustment, digital gain is applied according to predetermined physical quantities. Subsequently, a luminance signal Y and chroma signals Cr and Cb (hereinafter referred to as "Y/C signals") are generated through Y/C signal processing and the Y/C signals are stored in an area of the memory 72 other than the predetermined area.

Incidentally, the LCD 44 can be used as a viewfinder, being capable of displaying moving images (live view) obtained by continuous image pickup by the CCD 24. When the LCD 44 is used as a viewfinder, the generated Y/C signals are outputted in sequence to the LCD 44 via the LCD interface 42. Consequently, the live view is displayed on the LCD 44.

When a user half-presses the release button, an AE function makes exposure settings and an AF function controls focusing. Then, if the user full-presses the release button, the Y/C signals stored in the memory 72 at this time are compressed by the compression/decompression circuit 86 in a predetermined compression format (JPEG format, according to the present embodiment) and stored on the memory card 82 via the external memory interface 80. Consequently, a photograph is taken.

If the user has selected forced-flash mode using the forced-flash button, the CPU 50 fires the flash unit 62 forcibly at the time of photography. Even if the forced-flash mode has not been selected, if image information obtained via the CCD 24 indicates that a photometric level is lower than a predetermined level, the CPU 50 fires the flash unit 62.

If the flash unit 62 has not been charged sufficiently, the CPU 50 makes the charging unit 60 charge the flash unit 62 in preparation for firing in parallel with displaying live view on the LCD 44.

Figure 2:
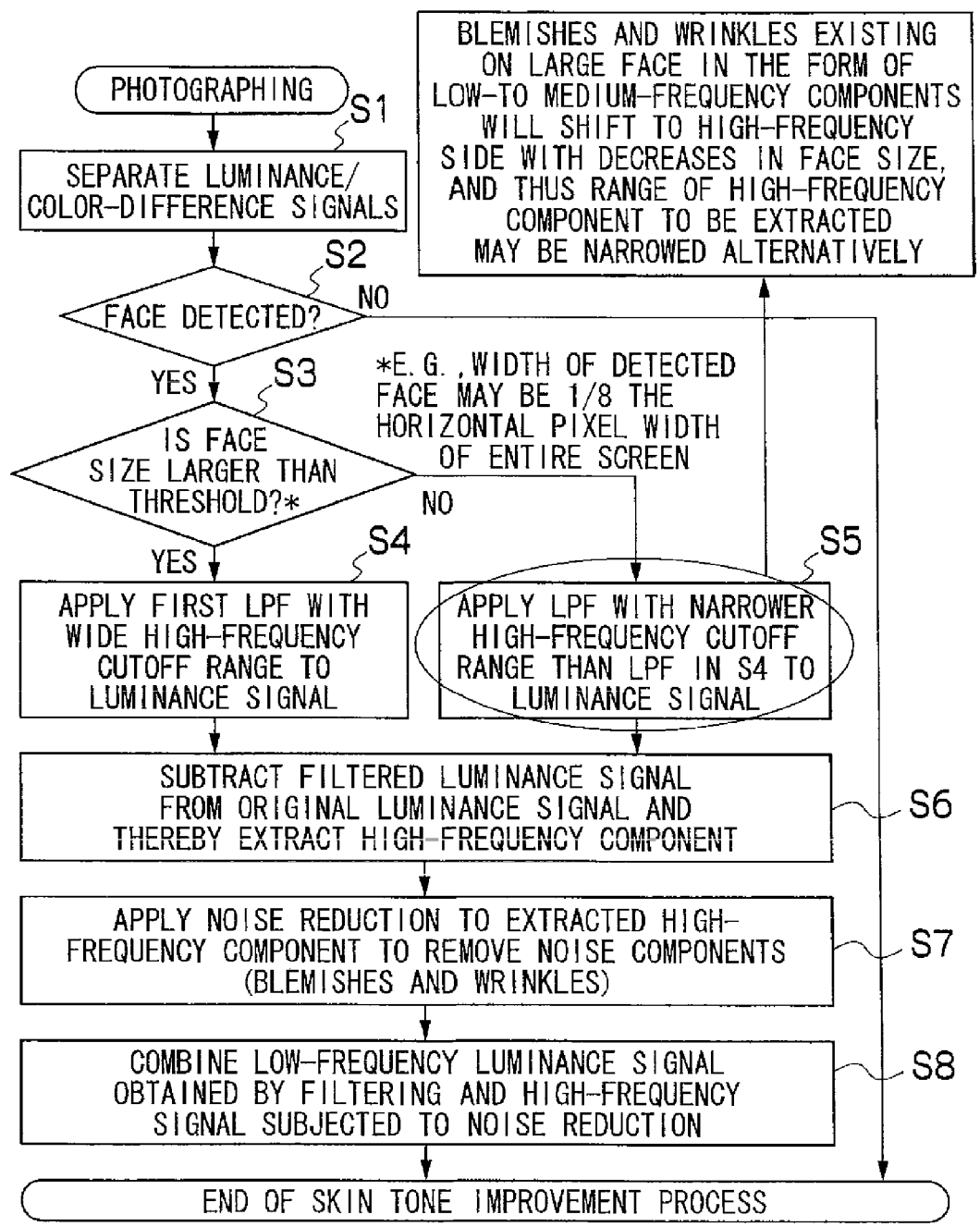
FIG. 2 is a flowchart of a skin tone improvement process according to the first embodiment.

Next, a flow of a skin tone improvement process performed by the digital camera 10 will be described with reference to a flowchart in FIG. 2.

In S1, the luminance/color-difference signal separating unit 30a performs Y/C processing to convert R, G, and B data of an original photographic image outputted from the ADC 28 into the luminance signal Y and color-difference signals Cr and Cb. The luminance/color-difference signal separating unit 30a sends luminance signal Y to the luminance signal noise reduction processing unit 30c.

In S2, the face detecting unit 91 tries to detect a facial region. If a facial region is detected successfully, the flow goes to S3.

In S3, the face size determining unit 30b acquires size of the facial region (i.e., face size) detected by the face detecting unit 91. The face size determining unit 30b determines whether the size of the facial region is equal to or larger than a predetermined threshold (e.g., whether horizontal width of the detected facial region is equal to or larger than ⅛ the horizontal pixel width of the entire screen). If the size of the facial region is equal to or larger than the predetermined threshold, the flow goes to S4. Otherwise, the flow goes to S5.

Figure 3:
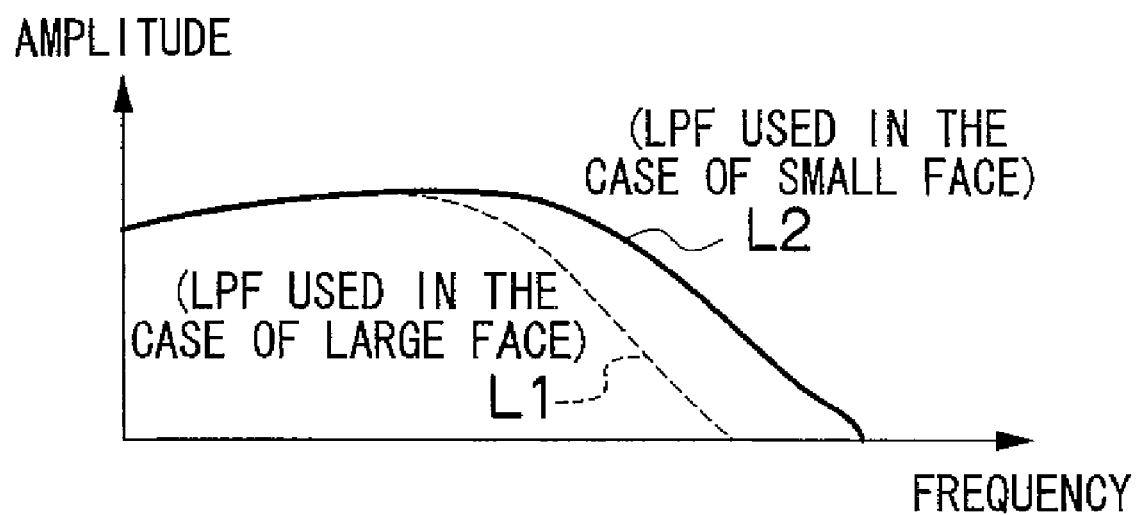
FIG. 3 is a diagram showing an example of low pass filters L1 and L2.

In S4, the luminance signal noise reduction processing unit 30c cuts a high-frequency noise component of the luminance signal Y using a first low pass filter L1 (see FIG. 3) and thereby generates a low-frequency luminance signal Y1.

In S5, the luminance signal noise reduction processing unit 30c cuts a high-frequency noise component of the luminance signal Y using a second low pass filter L2 (see FIG. 3) and thereby generates a luminance signal Y1 The second low pass filter L2 has a narrower high-frequency cutoff range than the first low pass filter L1.

In S6, the luminance signal noise reduction processing unit 30c subtracts the luminance signal Y1 from the original luminance signal Y using a subtractor (not shown) and thereby extracts a high-frequency differential signal Yd.

Figure 4:
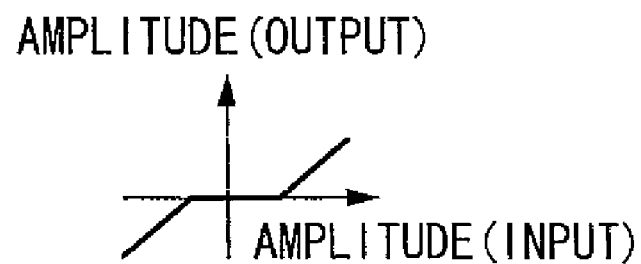
FIG. 4 is a diagram showing an example of a function superimposed on an image signal in a coring process.

In S7, the luminance signal noise reduction processing unit 30c reduces noise in the differential signal Yd and thereby generates a high-frequency differential signal Y2 with reduced noise. This is done, for example, using coring. That is, as shown in FIG. 4, coring is the process of preventing passage of small-amplitude signals out of the differential signal Yd and involves producing an output by removing or suppressing signals of a smaller amplitude than a predetermined amplitude by regarding the small-amplitude signals as noise.

In S8, the luminance signal noise reduction processing unit 30c combines the signal Y1 and signal Y2 using an adder (not shown) and thereby generates a final luminance signal Y3, which is made up of large-amplitude signals (which correspond to the background) left after small-amplitude signals (which correspond to blemishes and wrinkles) have been removed from the high-frequency component Yd of the original luminance signal Y.

Concrete examples of image processing using the noise reduction process are explained using FIGS. 5A to 6G. FIGS. 5A to 5G explain the process when a facial region is equal to or larger than a predetermined threshold and FIGS. 6A to 6G explain the process when the facial region is smaller than the predetermined threshold.

Figure 5A:
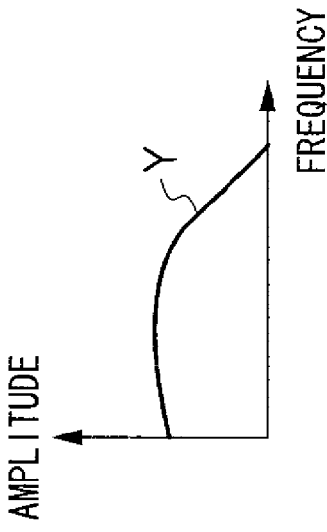
FIG. 5A is a diagram showing an example of an image including a large facial region.
Figure 5B:
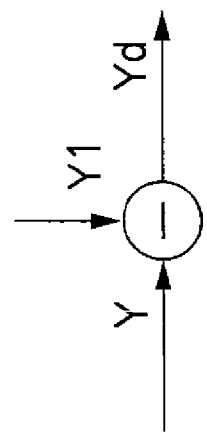
FIG. 5B is a diagram showing an example of frequency characteristic of a luminance signal.
Figure 5C:
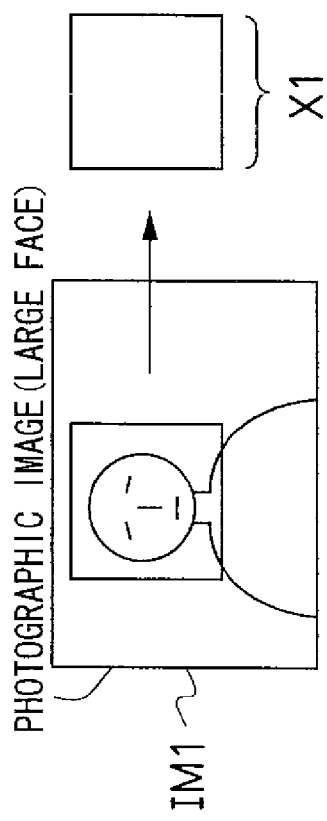
FIG. 5C is a diagram showing an example of a low pass filter to be used when a facial region is large.

First, a facial region is detected in an original photographic image IM1 as shown in FIG. 5A and frequency characteristic of a luminance signal Y of the original photographic image IM1 is obtained as shown in FIG. 5B. If the size of the facial region in the original photographic image IM1 is equal to or larger than the predetermined threshold, the low-frequency luminance signal Y1 is obtained using the first low pass filter L1 exemplified in FIG. 5C.

Figure 5D:
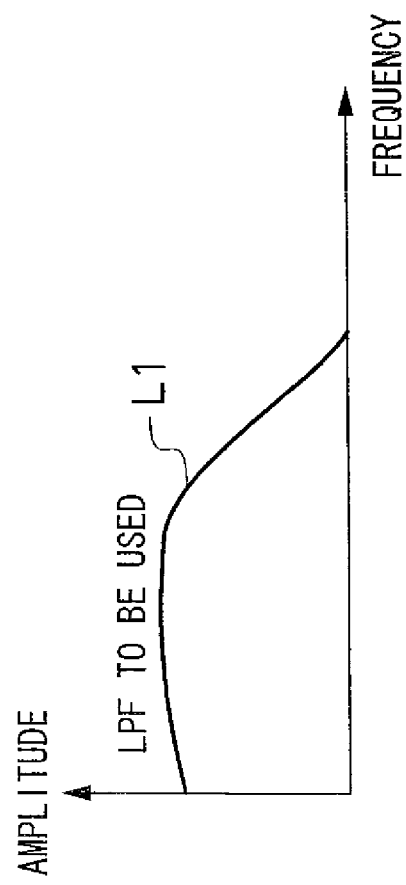
FIG. 5D is a diagram showing, in an exemplary manner, a signal process to obtain a high-frequency differential signal.
Figure 5F:
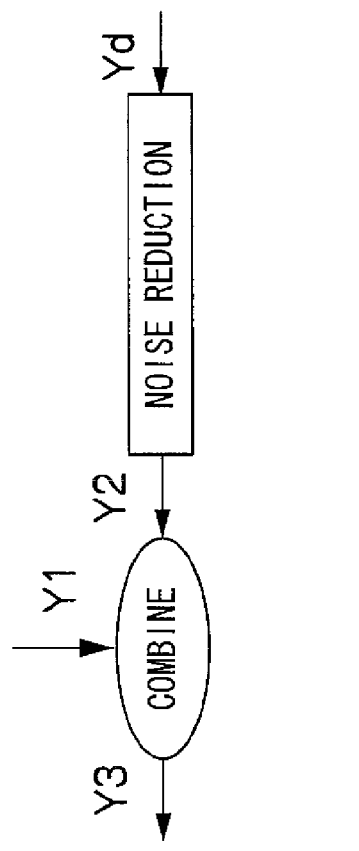
FIG. 5F is a diagram showing, in an exemplary manner, a signal process to obtain a final luminance signal.
Figure 5G:
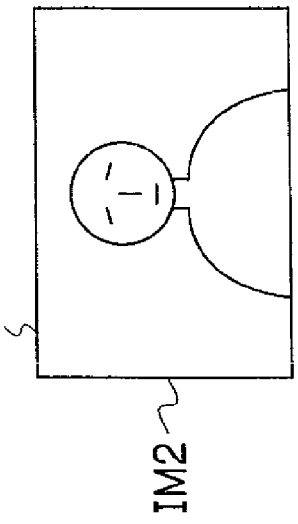
FIG. 5G is a diagram showing an example of the image of FIG. 5A after the skin tone improvement process.
Figure 5E:
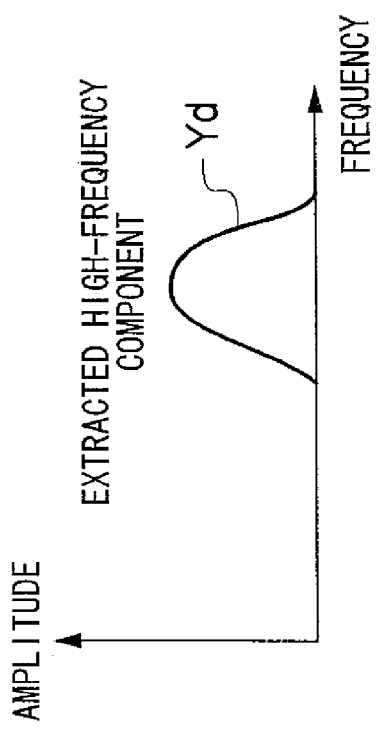
FIG. 5E is a diagram showing an example of frequency characteristic of the high-frequency differential signal.

Next, as shown in FIG. 5D, the low-frequency luminance signal Y1 is subtracted from the original luminance signal Y to extract the high-frequency differential signal Yd. FIG. 5E exemplifies frequency characteristic of the high-frequency differential signal Yd. A noise reduction process such as coring is applied to the high-frequency differential signal Yd to obtain the high-frequency differential signal Y2 with small-amplitude signals (i.e., only noise) reduced. Then, as shown in FIG. 5F, the low-frequency luminance signal Y1 and the differential signal Y2 obtained by removing small-amplitude signals (i.e., only noise) are added to generate the final luminance signal Y3. Image data which includes Y3, Cr, and Cb is final image data IM2 (shown in FIG. 5G) which has gone through the skin tone improvement process.

Figure 6B:
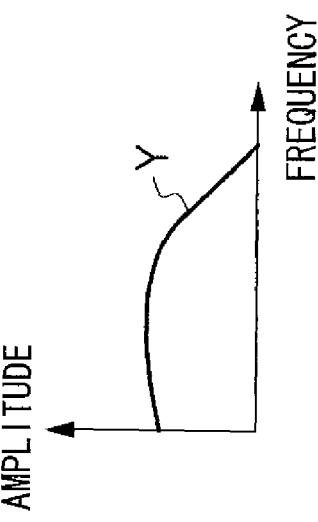
FIG. 6B is a diagram showing an example of frequency characteristic of a luminance signal.
Figure 6D:
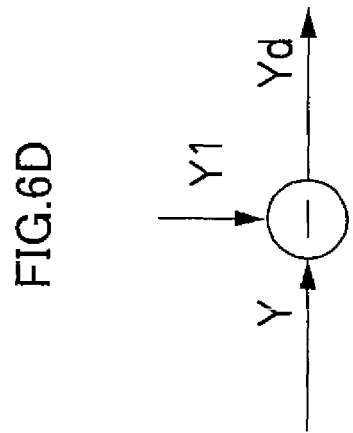
FIG. 6D is a diagram showing, in an exemplary manner, a signal process to obtain a high-frequency differential signal.
Figure 6A:
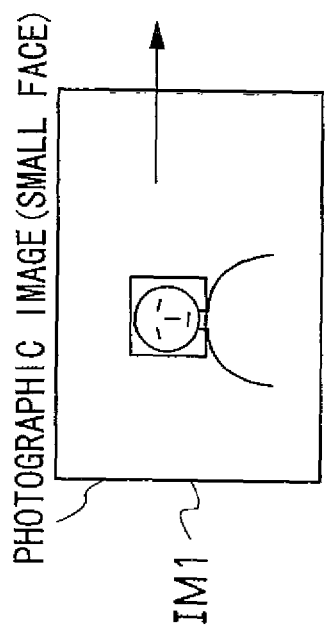
FIG. 6A is a diagram showing an example of an image including a small facial region.
Figure 6C:
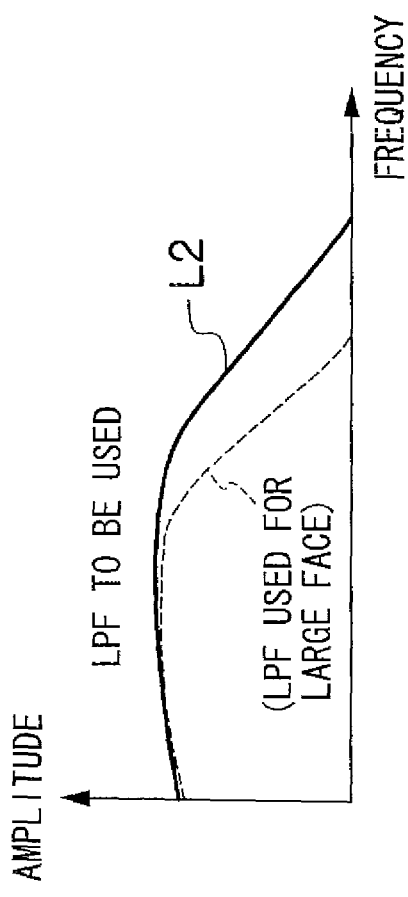
FIG. 6C is a diagram showing an example of a low pass filter to be used when a facial region is small.

On the other hand, if the size of the facial region in the original photographic image IM1 (shown in FIG. 6A) is smaller than the predetermined threshold, the low-frequency luminance signal Y1 is obtained by cutting only a high-frequency component of the luminance signal using the second low pass filter (LPF) L2 exemplified in FIG. 6C. FIG. 6C shows the LPF L2 which is used when the facial region is small with a solid line and the LPF L1 which is used when the facial region is large with a broken line.

Figure 6F:
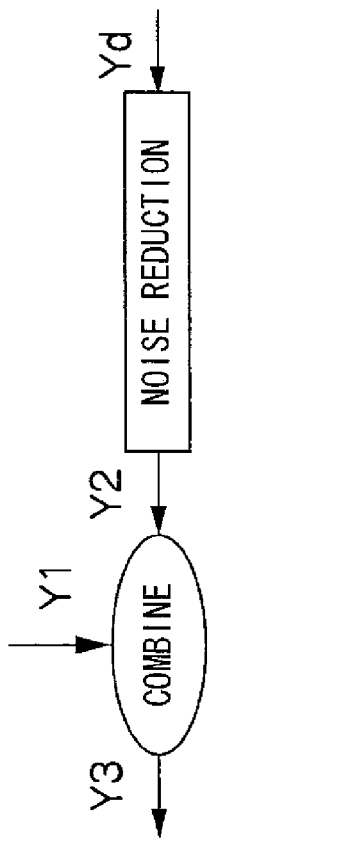
FIG. 6F is a diagram showing, in an exemplary manner, a signal process to obtain a final luminance signal.
Figure 6E:
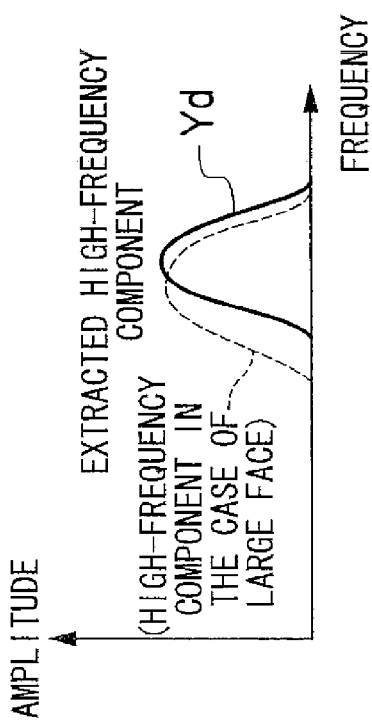
FIG. 6E is a diagram showing an example of frequency characteristic of the high-frequency differential signal.
Figure 6G:
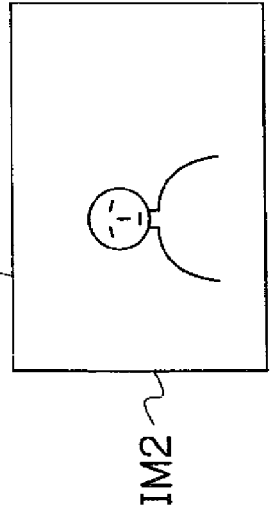
FIG. 6G is a diagram showing an example of the image of FIG. 6A after the skin tone improvement process.

Next, as shown in FIG. 6D, the low-frequency luminance signal Y1 is subtracted from the original luminance signal Y to extract the high-frequency differential signal Yd. FIG. 6E exemplifies frequency characteristic of the high-frequency differential signal Yd. FIG. 6E shows the high-frequency differential signal Yd when the facial region is small with a solid line and that when the facial region is large with a broken line.

A noise reduction process such as coring is applied to the high-frequency differential signal Yd to obtain the high-frequency differential signal Y2 with small-amplitude signals (i.e., only noise) reduced. Then, as shown in FIG. 6F, the low-frequency luminance signal Y1 and the differential signal Y2 are added to generate the final luminance signal Y3. Image data which includes Y3, Cr, and Cb is final image data IM2 (shown in FIG. 6G) which has gone through the skin tone improvement process.

Even if the same subject is photographed, wrinkles and blemishes on facial surfaces look different between a close shot and a long shot. Since details of the face are omitted when the face is reduced in size, fine wrinkles and blemishes recognized on a large face become less noticeable on a small face.

Thus, the low pass filter L2 used for small facial regions is designed to have a regions to extract the high-frequency component Yd in a narrower range. Varying a high-frequency component to be extracted depending on the size of the facial region results in a difference of effect of skin tone improvement between when a size of the face region is large and when it is small, even though the same noise reduction process is applied.

The high-frequency differential signal Yd has a narrower frequency range when the facial region is small than when the facial region is large. However, since details of the face are omitted when the face is reduced in size and fine wrinkles and blemishes recognized on a large face become less noticeable on a small face as described above, noise reduction in such a narrow range has a sufficient effect.

Also since the high-frequency differential signal Yd has a narrower frequency range when the facial region is small than when the facial region is large, details of the background which are conventionally lost unnecessarily remain even after the noise reduction. That is, the present embodiment can both improve skin tones and maintain background image quality.

Second Embodiment

Figure 7:
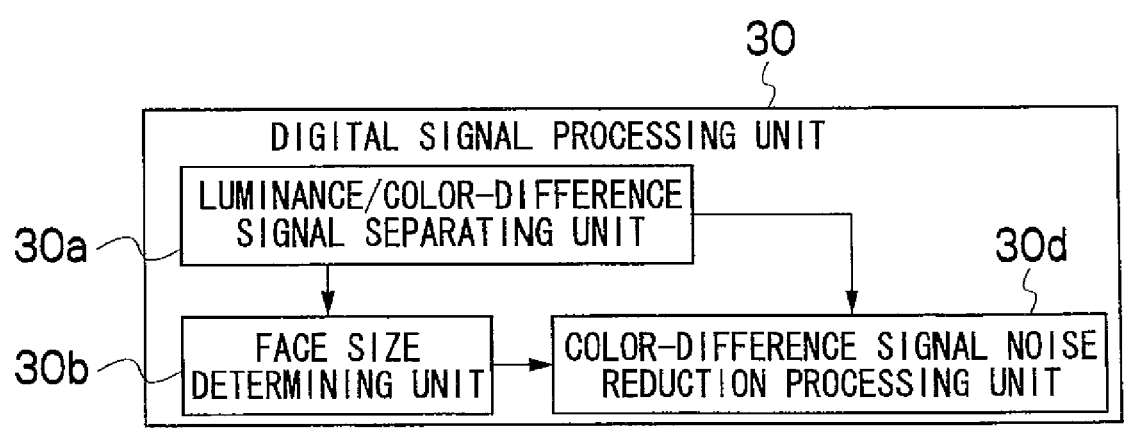
FIG. 7 is a block diagram showing a digital signal processing unit according to a second embodiment.

FIG. 7 shows a detailed configuration of the digital signal processing unit 30 in the digital camera 10 according to a second embodiment. The digital signal processing unit 30 according to the second embodiment includes a color-difference signal noise reduction processing unit 30d instead of the luminance signal noise reduction processing unit 30c, compared with the configuration in the first embodiment. The same components as those in the other embodiments are designated by the same reference numerals as the corresponding components in the other embodiments.

Figure 8:
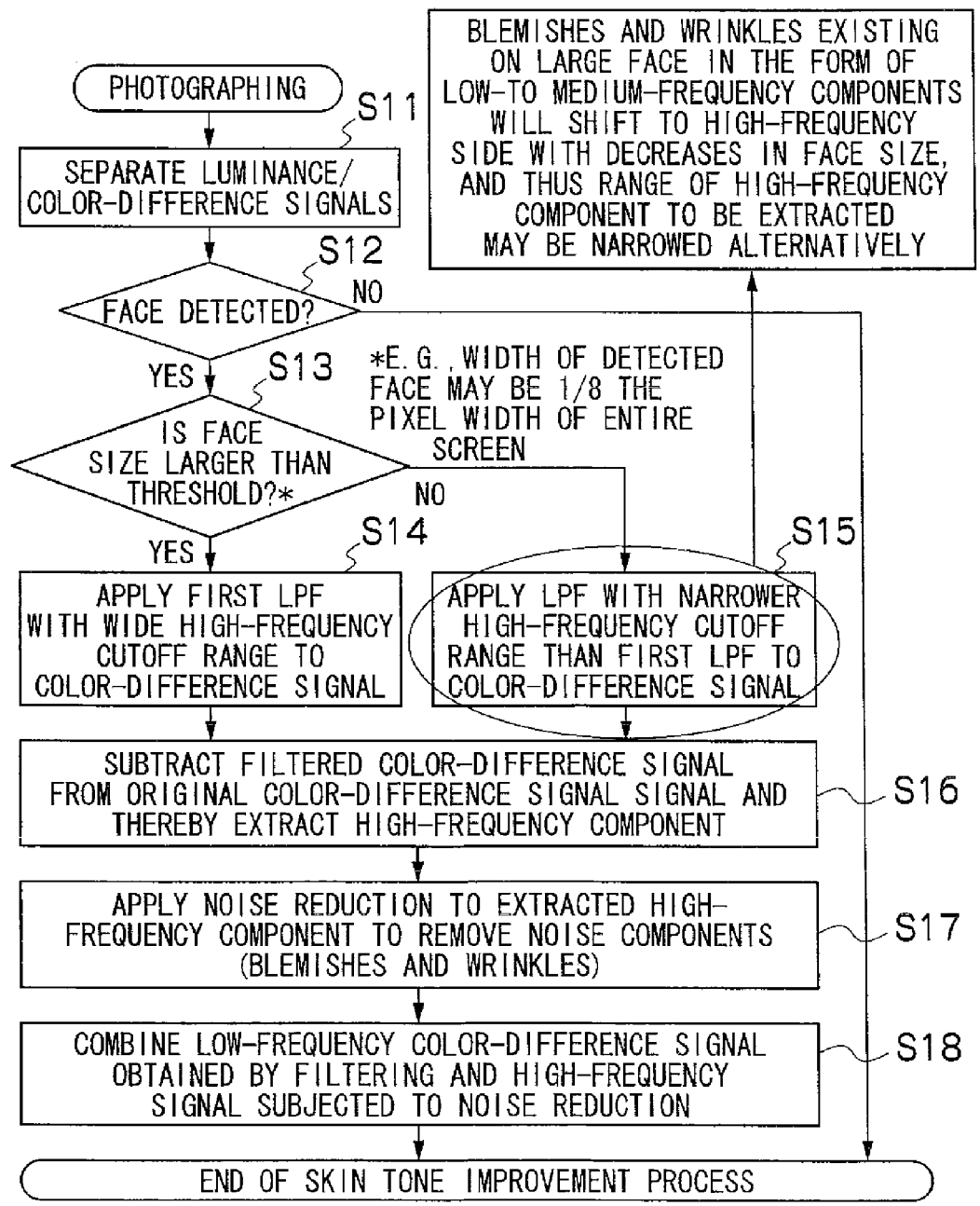
FIG. 8 is a flowchart of a skin tone improvement process according to the second embodiment.

FIG. 8 illustrates a flow of a skin tone improvement process performed by the digital camera 10 according to the second embodiment.

In S11, the luminance/color-difference signal separating unit 30a performs Y/C processing to convert R, G, and B data of an original photographic image outputted from the ADC 28 into the luminance signal Y and color-difference signals Cr and Cb (the color-difference signals will be designated collectively by C). The luminance/color-difference signal separating unit 30a sends the color-difference signal C to the color-difference signal noise reduction processing unit 30d.

In S12, the face detecting unit 91 tries to detect a facial region. If a facial region is detected successfully, the flow goes to S13.

In S13, the face size determining unit 30b acquires size of the facial region based on the facial region detected by the face detecting unit 91. The face size determining unit 30b determines whether the size of the facial region is equal to or larger than a predetermined threshold (e.g. whether, width of the detected facial region is equal to or larger than ⅛ the horizontal pixel width of the entire screen). If the size of the facial region is equal to or larger than the predetermined threshold, the flow goes to S14. Otherwise, the flow goes to S15.

In S14, the color-difference signal noise reduction processing unit 30d cuts a high-frequency noise component of the color-difference signal C using the first low pass filter L1 (see FIG. 9B) and thereby generates a low-frequency color-difference signal C1.

In S15, the color-difference signal noise reduction processing unit 30d cuts a high-frequency noise component of the color-difference signal C using the second low pass filter L2 (see FIG. 10B) and thereby generates a low-frequency color-difference signal C1. The second low pass filter L2 has a narrower high-frequency cutoff range than the first low pass filter L1.

In S16, the color-difference signal noise reduction processing unit 30d subtracts the color-difference signal C1 from the original color-difference signal C using a subtractor (not shown) and thereby extracts a high-frequency differential signal Cd.

In S17, a noise reduction is applied to the differential signal Cd so as to generate a high-frequency differential signal C2 with reduced noise. This is done, for example, using coring. That is, coring is a process for preventing passage of small-amplitude signals out of the differential signal Cd and involves producing an output by removing or suppressing signals of smaller amplitude than predetermined amplitude by regarding the small-amplitude signals as noise.

In S18, the color-difference signal noise reduction processing unit 30d combines the color-difference signal C1 and signal C2 using an adder (not shown) and thereby generates a final color-difference signal C3, which is made up of large-amplitude signals (which correspond to the background) left after small-amplitude signals (which correspond to blemishes and wrinkles) have been removed from the high-frequency component Cd obtained by passing the original color-difference signal C through the filter L1.

Concrete examples of image processing using the noise reduction process are shown in FIGS. 9A to 10G, where FIGS. 9A to 9G assume that a facial region is equal to or larger than a predetermined threshold and FIGS. 10A to 10G assume that the facial region is smaller than the predetermined threshold.

Figure 9A:
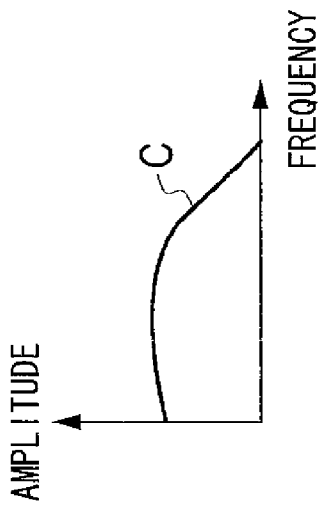
FIG. 9A is a diagram showing an example of an image including a large facial region.
Figure 9B:
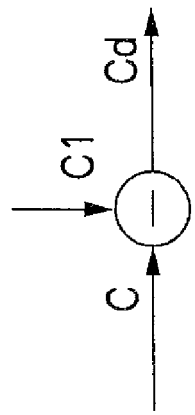
FIG. 9B is a diagram showing an example of frequency characteristic of a color-difference signal.
Figure 9C:
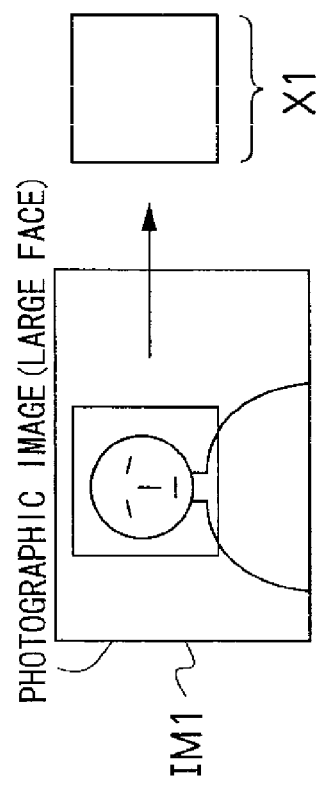
FIG. 9C is a diagram showing an example of a low pass filter to be used when a facial region is large.

First, a facial region is detected in an original photographic image IM1 as shown in FIG. 9A and frequency characteristic of a color-difference signal C of the original photographic image IM1 is obtained as shown in FIG. 9B. If the size of the facial region in the original photographic image IM1 is equal to or larger than the predetermined threshold, the low-frequency color-difference signal C1 is obtained by cutting a high-frequency component of the color-difference signal using a first low pass filter L1 exemplified in FIG. 9C.

Figure 9D:
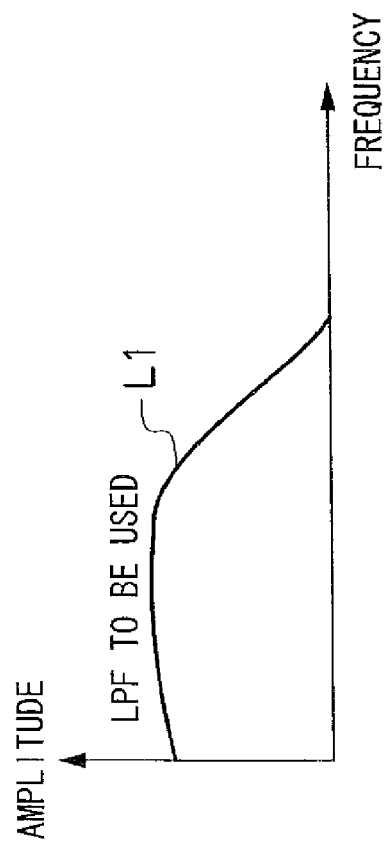
FIG. 9D is a diagram showing, in an exemplary manner, a signal process to obtain a high-frequency differential signal.
Figure 9F:
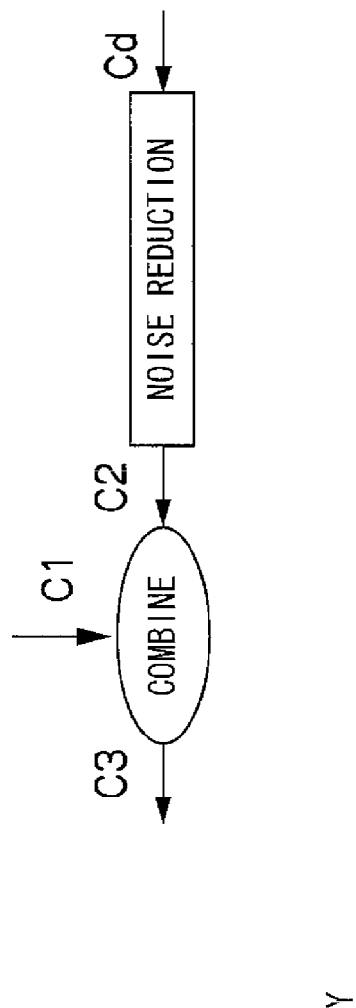
FIG. 9F is a diagram showing, in an exemplary manner, a signal process to obtain a final color-difference signal.
Figure 9G:
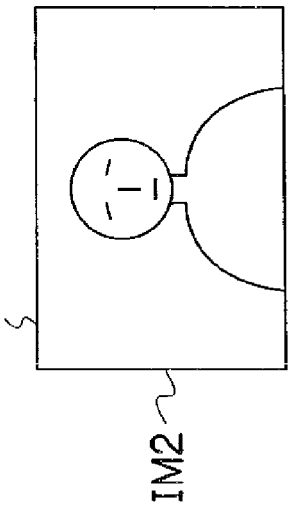
FIG. 9G is a diagram showing an example of the image of FIG. 9A after the skin tone improvement process.
Figure 9E:
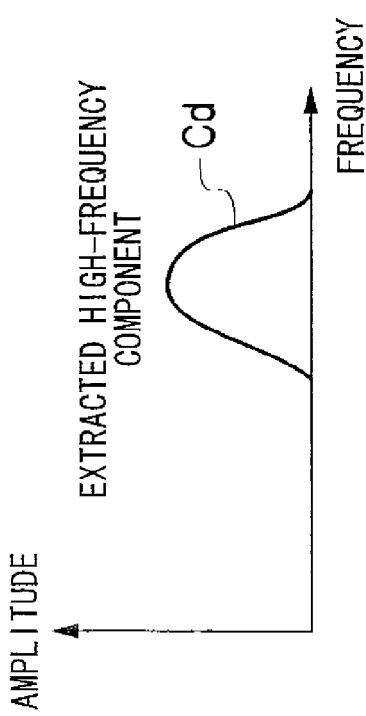
FIG. 9E is a diagram showing an example of frequency characteristic of the high-frequency differential signal.

Next, as shown in FIG. 9D, the color-difference signal C1 is subtracted from the original color-difference signal C to extract the high-frequency differential signal Cd. FIG. 9E exemplifies frequency characteristic of the high-frequency differential signal Cd. A noise reduction process such as coring is applied to the high-frequency differential signal Cd to obtain the high-frequency differential signal C2 with reduced noise. Then, as shown in FIG. 9F, the low-frequency color-difference signal C1 and the differential signal C2 are added to generate the final color-difference signal C3. Image data which includes C and Y is final image data IM2 (shown in FIG. 9G) which has gone through the skin tone improvement process.

Figure 10A:
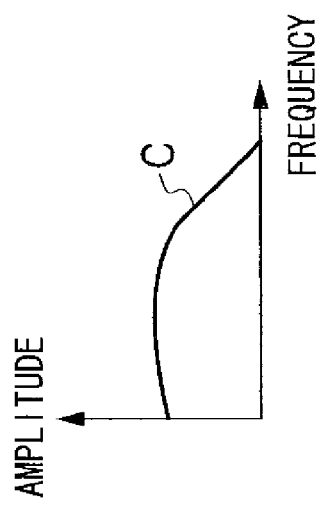
FIG. 10A is a diagram showing an example of an image including a small facial region.
Figure 10B:
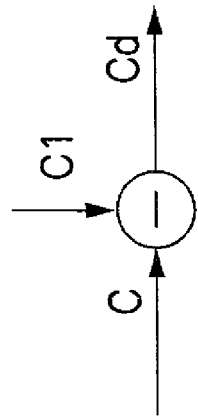
FIG. 10B is a diagram showing an example of frequency characteristic of a color-difference signal.
Figure 10C:
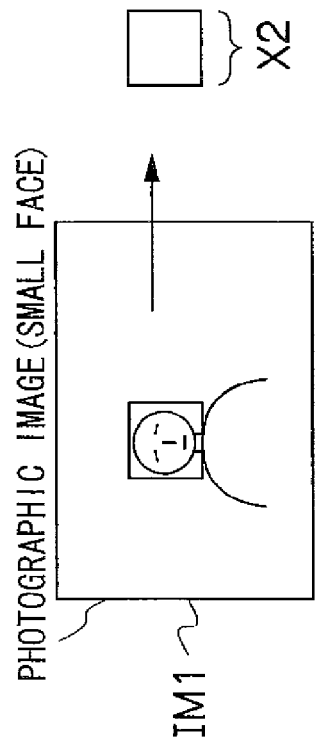
FIG. 10C is a diagram showing an example of a low pass filter to be used when a facial region is small.

On the other hand, if the size of a facial region in the original photographic image IM1 is smaller than the predetermined threshold as shown in FIG. 10A, the low-frequency color-difference signal C1 is obtained by cutting a high-frequency component of the color-difference signal using a second low pass filter L2 exemplified in FIG. 10C. FIG. 10C shows the LPF L2 which is used when the facial region is small with a solid line and the LPF L1 which is used when the facial region is large with a broken line.

Figure 10D:
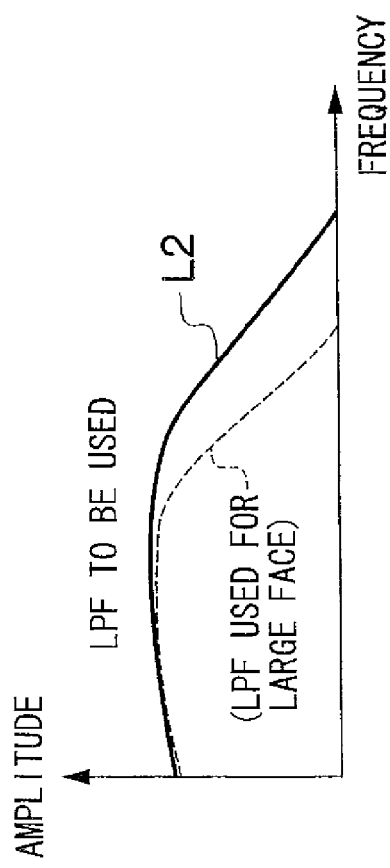
FIG. 10D is a diagram showing, in an exemplary manner, a signal process to obtain a high-frequency differential signal.
Figure 10F:
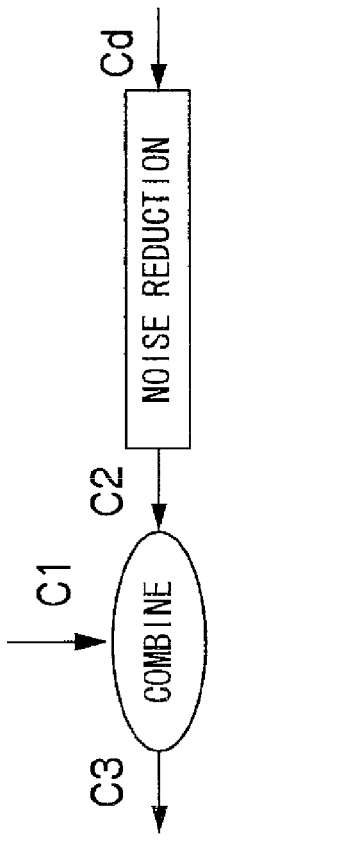
FIG. 10F is a diagram showing, in an exemplary manner, a signal process to obtain a final color-difference signal.
Figure 10E:
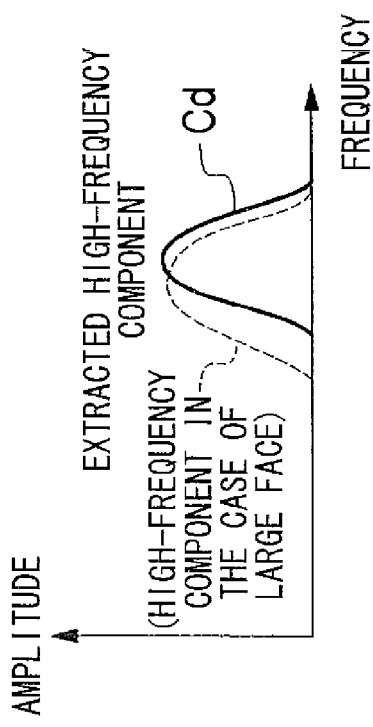
FIG. 10E is a diagram showing an example of frequency characteristic of the high-frequency differential signal.
Figure 10G:
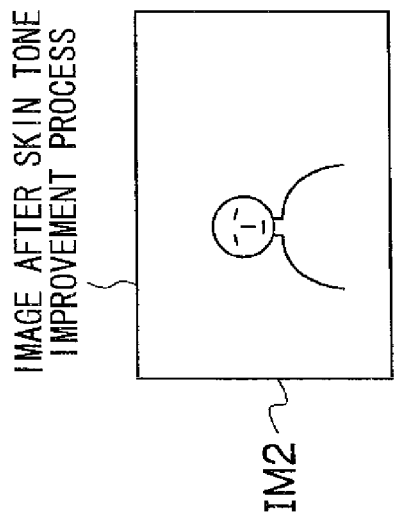
FIG. 10G is a diagram showing an example of the image of FIG. 10A after the skin tone improvement process.

Next, as shown in FIG. 10D, the color-difference signal C1 is subtracted from the original color-difference signal C to extract the high-frequency differential signal Cd. FIG. 10E exemplifies frequency characteristics of the high-frequency differential signal Cd. FIG. 10E shows the high-frequency differential signal Cd when the facial region is small with a solid line and that when the facial region is large with a broken line.

A noise reduction process such as coring is applied to the high-frequency differential signal Cd to obtain the high-frequency differential signal C2 with reduced noise. Then, as shown in FIG. 10F, the low-frequency color-difference signal C1 and the differential signal C2 are added to generate the final color-difference signal C3. Image data which includes C and Y is final image data IM2 (shown in FIG. 10G) which has gone through the skin tone improvement process.

Even if the same subject is photographed, color irregularities appear on facial surfaces differently between a close shot and long shot. Color irregularities are less noticeable on a small face, which has a smaller skin area. Hence, it is desirable to change noise reduction effect also on the color-difference signal depending on the size of the facial region.

Thus, the low pass filter L2 used for small facial regions is designed to have a wider high-frequency cutoff range than the low pass filter L1 used for large facial regions to extract the high-frequency component Cd in a narrower range. Varying a high-frequency component to be extracted depending on the size of the facial region results in a difference of effect of skin tone improvement between when a size of the face region is large and when it is small, even though the same noise reduction process is applied.

The high-frequency differential signal Cd has a narrower frequency range when the facial region is small than when the facial region is large as shown in FIG. 10F. However, since details of the face are omitted and color irregularities recognized on a large face become less noticeable on a small face when the size of the facial region is small as described above, noise reduction in such a narrow range has a sufficient effect. In addition, when the size of the facial region is small, only a simple noise reduction process will serve the purpose unlike conventional noise reduction, making it possible to prevent color bleeding and blurring in the background. That is, the present embodiment can both improve skin tones and maintain background image quality.

Third Embodiment

Figure 11:
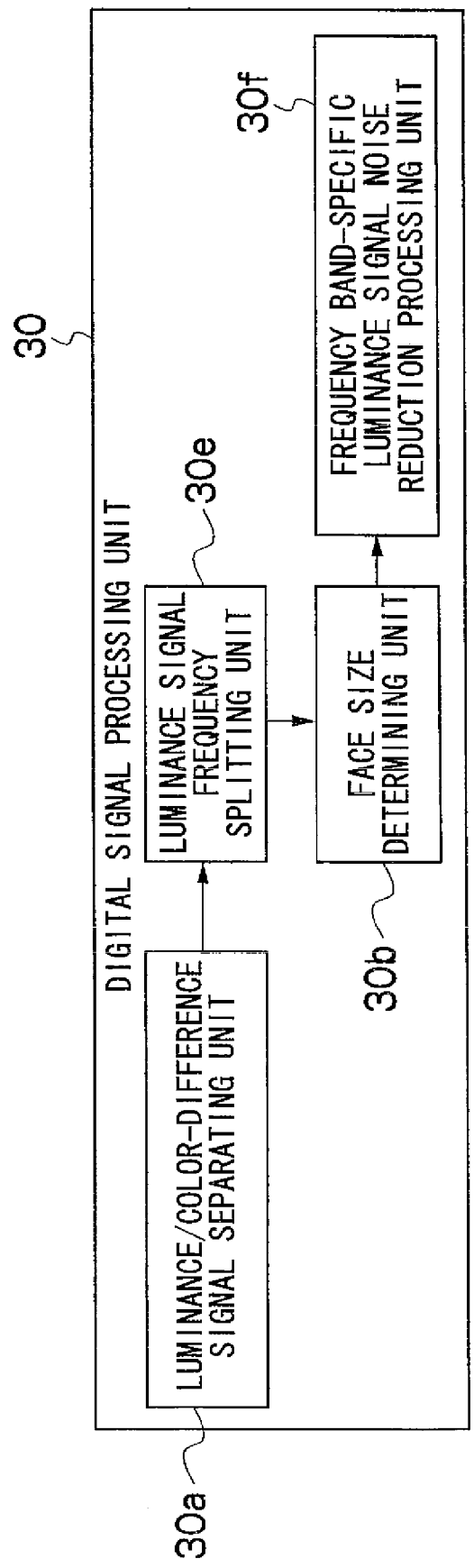
FIG. 11 is a block diagram showing a digital signal processing unit according to a third embodiment.

FIG. 11 shows a detailed configuration of the digital signal processing unit 30 in the digital camera 10 according to a third embodiment. The digital signal processing unit 30 includes a luminance signal frequency splitting unit 30e and frequency band-specific luminance signal noise reduction processing unit 30f as well as the luminance/color-difference signal separating unit 30a and the face size determining unit 30b. The same components as those in the other embodiments are designated by the same reference numerals as the corresponding components in the other embodiments.

Figure 12:
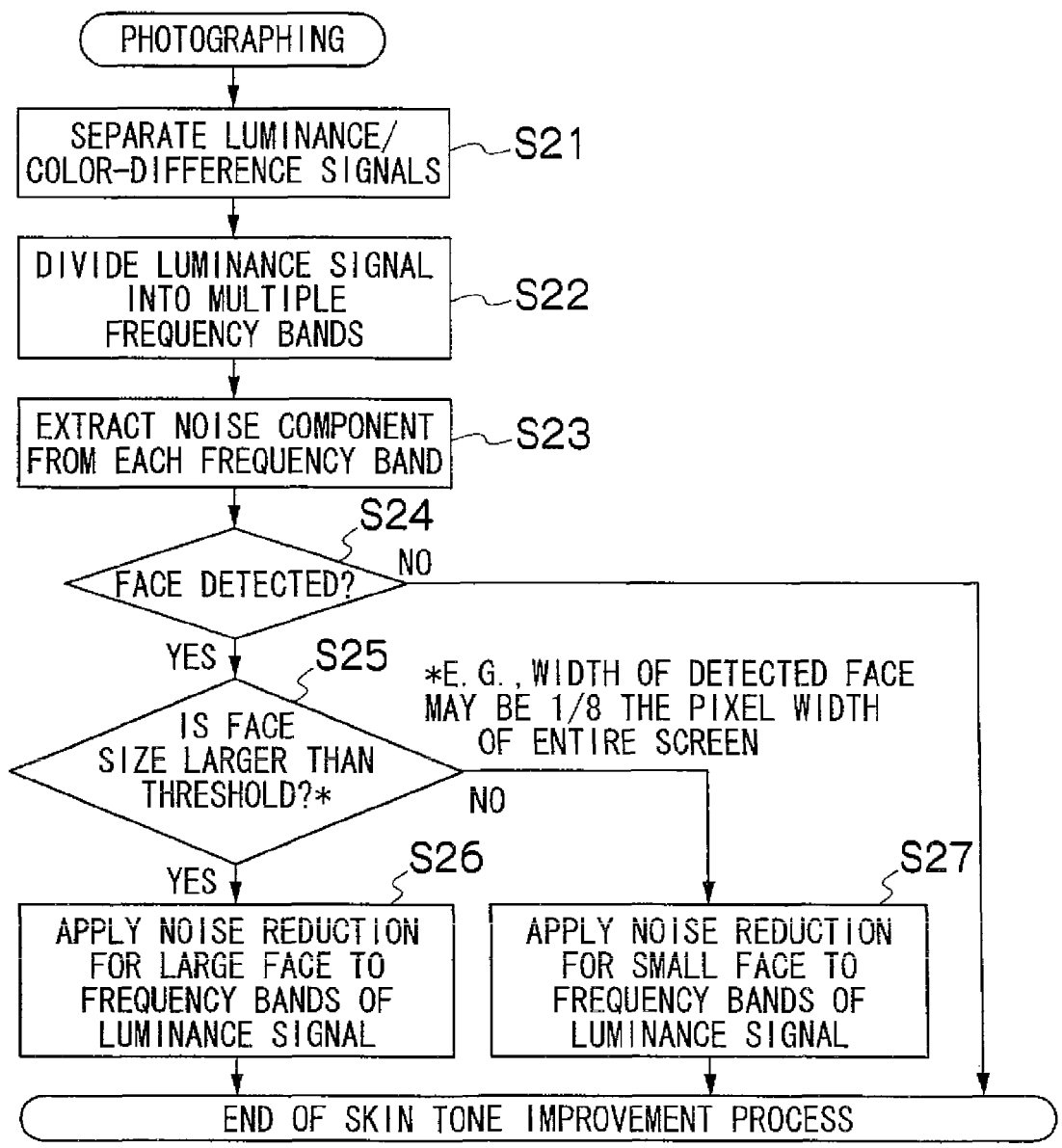
FIG. 12 is a flowchart of a skin tone improvement process according to the third embodiment.

FIG. 12 illustrates a flow of a skin tone improvement process performed by the digital camera 10 according to the third embodiment.

S21 is the same as S1.

In S22, the luminance signal Y is divided into a plurality of frequency bands (e.g., three bands: high, medium, and low).

In S23, the frequency band-specific luminance signal noise reduction processing unit 30f extracts from the luminance signal Y, a frequency component each of which corresponds to each of the frequency bands (e.g., three bands: high, medium, and low).

In S24, as in S2, it is determined whether a facial region has been detected successfully. If it is determined that a facial region has been detected successfully, the flow goes to S25.

In S25, the face size determining unit 30b determines whether the size of the facial region is equal to or larger than a predetermined threshold (e.g., whether width of the detected facial region is equal to or larger than ⅛ the horizontal pixel width of the entire screen). If the size of the facial region is equal to or larger than the predetermined threshold, the flow goes to S26. Otherwise, the flow goes to S27.

FIG. 13 shows an example of a weight table according to the third embodiment. The example shown in FIG. 13 is a weight table which is used when the luminance signal Y is divided into three frequency bands. In the weight table, a noise reduction weight is assigned to each of the frequency bands according to a size of a facial region.

In S26, each of the frequency components of the luminance signal Y is subjected to a first noise reduction which is performed when the face is large. For example, as shown in a weight table in FIG. 13, the component in the high frequency band is subjected to a process with a high noise reduction effect (e.g., by cutting a wide frequency band by coring), the component in the medium frequency band is subjected to a process with a high noise reduction effect, and the component in the low frequency band is subjected to a process with a high noise reduction effect. Thus, the noise reduction weight corresponding to each of frequency bands is determined and each of frequency components is subjected to an appropriate weighted noise reduction process depending on the determined weight so as to remove only the frequency components which correspond to blemishes and wrinkles from the luminance signal Y.

In S27, each of the frequency components of the luminance signal Y is subjected to a second noise reduction which is performed when the face is small. For example, as shown in a weight table in FIG. 13, the component in the high frequency band is subjected to a process with a high noise reduction effect (e.g., by cutting a wide frequency band by coring), the component in the medium frequency band is subjected to a process a medium noise reduction effect (e.g., by cutting a moderately wide frequency band by coring), and the component in the low frequency band is subjected to a process with a low noise reduction effect (e.g., by cutting a narrow frequency band by coring). Thus, the noise reduction weight corresponding to each of frequency bands is determined and each of frequency components is subjected to an appropriate weighted noise reduction process depending on the determined weight so as to remove only the frequency components which correspond to blemishes and wrinkles from the luminance signal Y.

Concrete examples of image processing using the noise reduction process are shown in FIGS. 14A to 15C, where a frequency band of a luminance signal is divided into three. FIGS. 14A to 14C assume that a facial region is equal to or larger than a predetermined threshold and FIGS. 15A to 15C assume that the facial region is smaller than the predetermined threshold.

First, as shown in FIG. 14B, a luminance signal Y is extracted from an original photographic image IM1 (shown in FIG. 14A) and divided into three frequency bands: high, medium, and low using a plurality of LPFs. Next, with small-amplitude component in each frequency band being regarded as noise (blemishes and wrinkles), a weight for coring (i.e., coring weight) is assigned to each frequency band according to the table in FIG. 13 (and FIG. 14C) and a noise reduction process is applied to each frequency band using the coring weight.

Figure 15B:
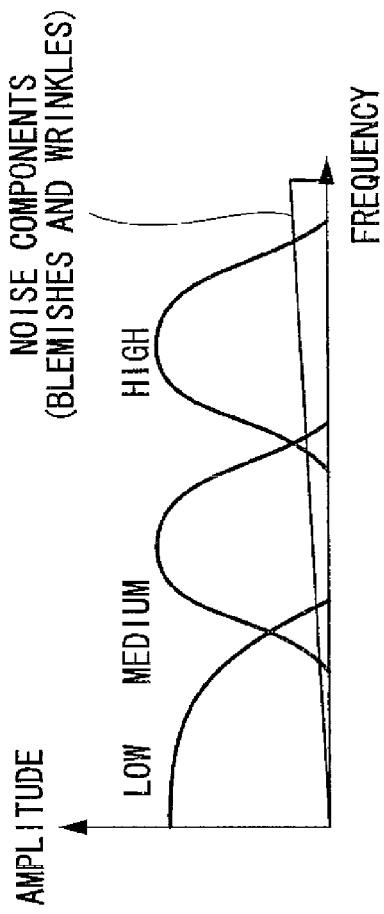
FIG. 15B is a diagram showing an example of frequency characteristics of a luminance signal divided into three frequency bands.
Figure 15A:
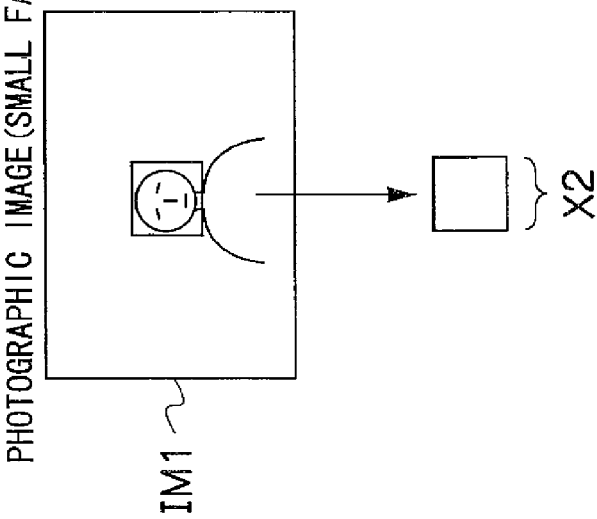
FIG. 15A is a diagram showing an example of an image including a small facial region.

As shown in FIG. 15B, the luminance signal Y is extracted from the original photographic image IM1 (shown in FIG. 15A) and divided into three frequency bands: high, medium, and low using a plurality of LPFs. Then, with small-amplitude component in each frequency band being regarded as noise (blemishes and wrinkles), a coring weight is assigned to each frequency band according to the table in FIG. 13 (and FIG. 15C) and a noise reduction process is applied to each frequency band using the coring weight.

Medium- to high-frequency components of wrinkles and blemishes (noise components) existing on a large face will shift to high-frequency side as a size of the facial region decreases as shown in FIG. 15B. This is because the noise components which are distinct at high resolution become fuzzy when resolution of the facial region decreases, i.e., frequency characteristics on a surface of the facial region constituting the image gather on the low-frequency side as the facial region becomes small.

When the facial region is small, noise reduction in the high-frequency band is enough to achieve desired effect and noise reduction in the low-frequency band does not make much sense. Thus, when the facial region is small, a particularly great weight is assigned to the noise reduction in the high-frequency band.

In this way, as the frequency band of the luminance signal targeted for noise reduction is changed depending on the size of the facial region, it is possible to achieve higher noise reduction effect.

Fourth Embodiment

Figure 16:
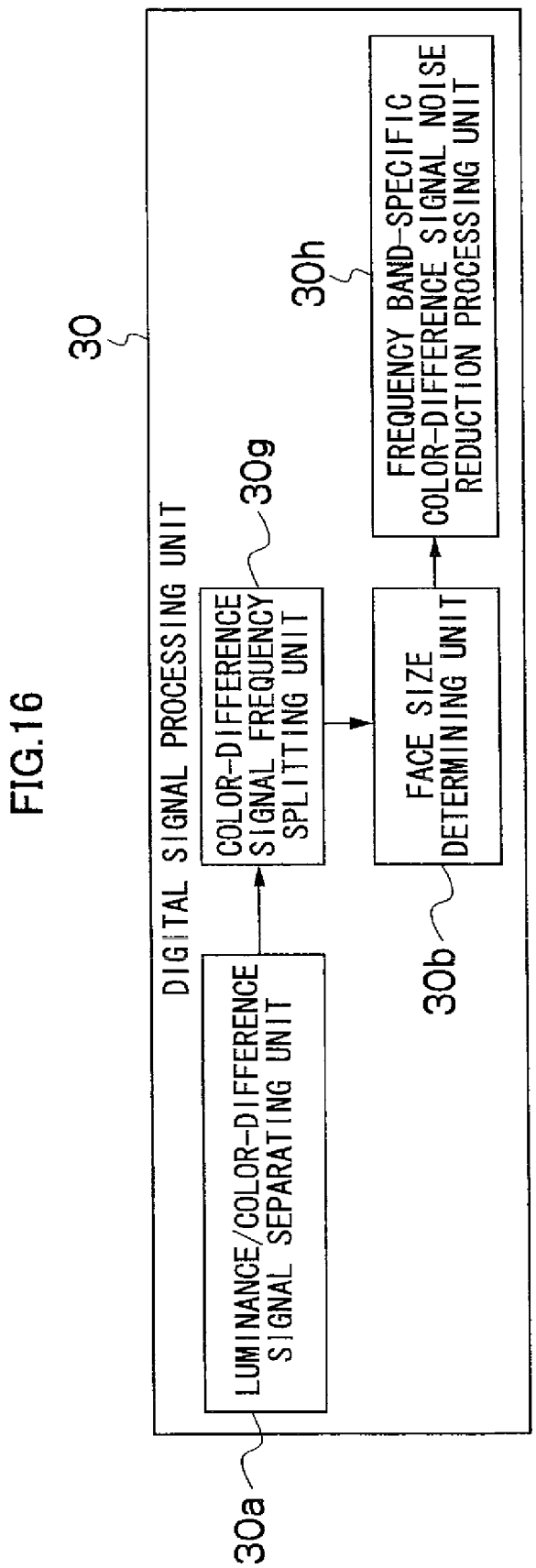
FIG. 16 is a block diagram showing a digital signal processing unit according to a fourth embodiment.

FIG. 16 shows a detailed configuration of the digital signal processing unit 30 in the digital camera 10 according to a fourth embodiment. The digital signal processing unit 30 includes a color-difference signal frequency splitting unit 30g and frequency band-specific color-difference signal noise reduction processing unit 30h as well as the luminance/color-difference signal separating unit 30a and the face size determining unit 30b. The same components as those in the other embodiments are designated by the same reference numerals as the corresponding components in the other embodiments.

In the third embodiment, a luminance signal is used for the skin tone improvement process. On the other hand, in the fourth embodiment, a color-difference signal is used for the skin tone improvement process in stead of the luminance signal.

Figure 17:
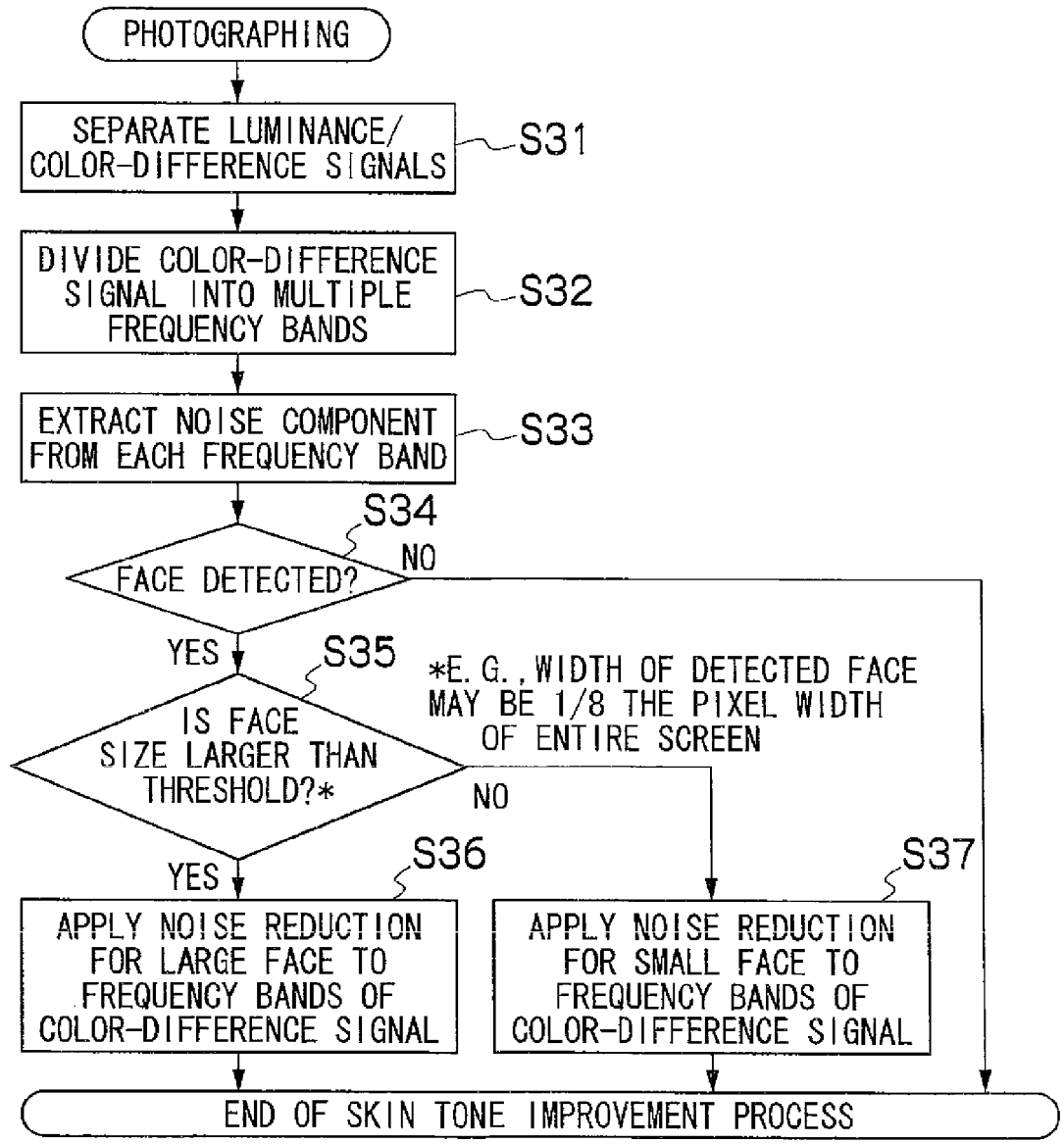
FIG. 17 is a flowchart of a skin tone improvement process according to the fourth embodiment.

FIG. 17 illustrates a flow of a skin tone improvement process performed by the digital camera 10 according to the fourth embodiment.

S31 and S32 are the same as S1 and S22, respectively.

In S33, with the color-difference signal C being divided into a plurality of frequency bands (e.g., three bands: "high", "medium", and "low"), the frequency band-specific color-difference signal noise reduction processing unit 30h extracts a frequency component which corresponds to each frequency band from the color-difference signal C.

In S34, as in S2, it is determined whether a facial region has been detected successfully. If it is determined that a facial region has been detected successfully, the flow goes to S35.

In S35, the face size determining unit 30b determines whether the size of the facial region is equal to or larger than a predetermined threshold (e.g., whether a width of the detected facial region is equal to or larger than ⅛ the horizontal pixel width of the entire screen). If the size of the facial region is equal to or larger than the predetermined threshold, the flow goes to S36. Otherwise, the flow goes to S37.

FIG. 18 shows an example of a weight table according to the fourth embodiment. The example shown in FIG. 18 is a weight table which is used when the color-difference signal C is divided into three frequency bands. In the weight table, a noise reduction weight is assigned to each frequency band according to a size of a facial region.

In S36, each of the frequency components of the color-difference signal C is subjected to a first noise reduction which is performed when the face is large. For example, as shown in a weight table in FIG. 18, the component in the high frequency band is subjected to a process with a high noise reduction effect (e.g., by cutting a wide frequency band by coring), the component in the medium frequency band is subjected to a process with a high noise reduction effect, and the component in the low frequency band is subjected to a process with a high noise reduction effect. Thus, the noise reduction weight corresponding to each of frequency bands is determined and each of frequency components is subjected to an appropriate weighted noise reduction process depending on the determined weight.

In S37, the frequency components of the color-difference signal C are subjected to second noise reduction which is performed when the face is small. For example, as shown in a weight table in FIG. 18, the component in the high frequency band is subjected to a process with a high noise reduction effect (e.g., by cutting a wide frequency band by coring), the component in the medium frequency band is subjected to a process a medium noise reduction effect (e.g., by cutting a moderately wide frequency band by coring), and the component in the low frequency band is subjected to a process with a low noise reduction effect (e.g., by cutting a narrow frequency band by coring). Thus, the noise reduction weight corresponding to each of frequency bands is determined and each of the frequency components is subjected to an appropriate weighted noise reduction process depending on the determined weight.

Concrete examples of image processing using the noise reduction process are shown in FIGS. 19A to 20C, where a frequency band of a luminance signal is divided into three. FIGS. 19A to 19C assume that a facial region is equal to or larger than a predetermined threshold and FIGS. 20A to 20C assume that the facial region is smaller than the predetermined threshold.

As shown in FIG. 19B, the color-difference signal C is extracted from the original photographic image IM1 (shown in FIG. 19A) and divided into three frequency bands: high, medium, and low using a plurality of LPFs. Next, with small-amplitude components in each frequency band being regarded as noise (blemishes and wrinkles), a coring weight is assigned to each frequency band according to the table in FIG. 18 (and FIG. 19C) and a noise reduction process is applied to each frequency band.

As shown in FIG. 20B, the color-difference signal C is extracted from the original photographic image IM1 (shown in FIG. 20A) and divided into three frequency bands: high, medium, and low using a plurality of LPFs. Next, with small-amplitude components in each frequency band being regarded as noise (blemishes and wrinkles), a coring weight is assigned to each frequency band according to the table in FIG. 18 (and FIG. 20C) and a noise reduction process is applied to each frequency band.

Medium- to high-frequency components of wrinkles and blemishes (noise components) existing on a large face will shift to high-frequency side as a size of the facial region decreases as shown in FIG. 20B. This is because the noise components which are distinct at high resolution become fuzzy when resolution of the facial region decreases, i.e., frequency characteristics on a surface of the facial region constituting the image gather on the low-frequency side as the facial region becomes small.

When the facial region is small, noise reduction in the high-frequency band is enough to achieve desired effect and noise reduction in the low-frequency band does not make much sense. Thus, when the facial region is small, a particularly great weight is assigned to the noise reduction in the high-frequency band.

In this way, as the frequency band of the color-difference signal targeted for noise reduction is changed according to the size of the facial region, it is possible to achieve higher noise reduction effect.

Fifth Embodiment

Figure 21:
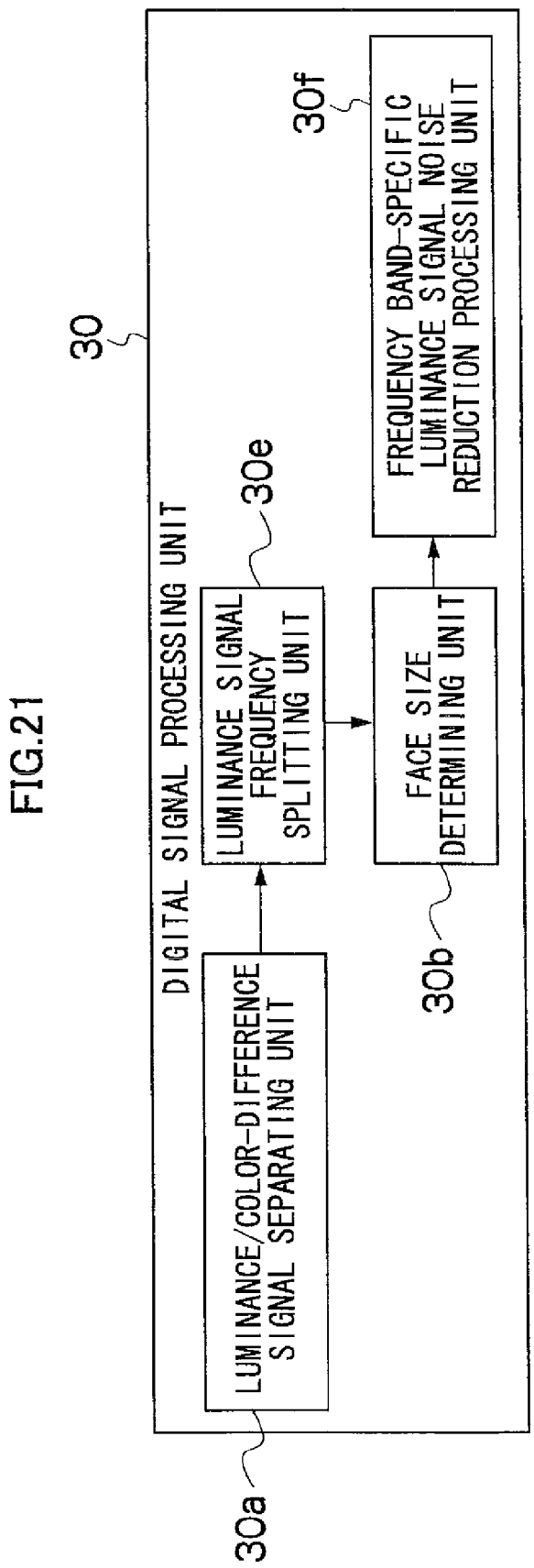
FIG. 21 is a block diagram showing a digital signal processing unit according to a fifth embodiment.

FIG. 21 shows a detailed configuration of the digital signal processing unit 30 in the digital camera 10 according to a fifth embodiment.

As shown in FIG. 21, the digital signal processing unit 30 according to the fifth embodiment includes: luminance/color-difference signal separating unit 30a; face size determining unit 30b; luminance signal frequency splitting unit 30e; and frequency band-specific luminance signal noise reduction processing unit 30f. The same components as those in the other embodiments are designated by the same reference numerals as the corresponding components in the other embodiments.

FIG. 22 illustrates a flow of a skin tone improvement process performed by the digital camera 10 according to the fifth embodiment.

S41 to S44 are the same as S21 to 824.

In S45, it is determined whether a facial region is "large" or not. FIG. 23 shows an example of a face size determination table in which the determination criteria are prescribed according to a ratio of a horizontal width of a facial region to that of an entire image. For example, the facial region is determined to be large according to a face size determination table in FIG. 23 if a ratio of a horizontal width of the facial region to that of the entire image is equal to or larger than ⅞. If it is determined that the facial region is large, the flow goes to S46.

In S46, the frequency band-specific luminance signal noise reduction processing unit 30f determines weights for frequency bands of the luminance signal Y according to rules used when the size of the facial region is "large" and performs a noise reduction process on the frequency bands according to the determined weights. FIG. 24 shows an example of a weight table which prescribes weights according to a size of a facial region In S46, weights used when the size of the facial region is "large" are assigned: specifically, "large" weights are assigned to all the high, medium, and low frequency bands. This is the same as in S26.

In S47, it is determined whether the size of the facial region is "small" or not. For example, if the width of the facial region is smaller than ⅛ the horizontal pixel width of the entire screen, it is determined based on the face size determination table in FIG. 23 that the facial region is small, and the flow goes to S48. Otherwise, the flow goes to S49.

In 848, the frequency band-specific luminance signal noise reduction processing unit 30f determines weights for frequency bands of the luminance signal Y according to rules used when the size of the facial region is "small" and performs a noise reduction process on the frequency bands according to the determined weights.

FIG. 24 shows an example of a weight table which prescribes weights according to the size of the facial region. In S48, weights used when the size of the facial region is "small" are assigned: specifically, a "large" weight is assigned to the high frequency band, a "medium" weight is assigned to the medium frequency band, and a "small" weight is assigned to the low frequency band. This is the same as in S27.

In S49, weights assigned to the frequency bands when the size of the facial region is "medium" (that is, the size of the facial region is intermediate between the threshold for "larger" and the threshold for "small") are determined by linear interpolation from the weights assigned to the frequency bands when the size of the facial region is "large" and the weights assigned to the frequency bands when the size of the facial region is "small."

For example, FIG. 25 generally shows parameters used for such linear interpolation, where weights for the high, medium, and low frequency bands of the luminance signal Y are given by parameters "Y_BL_H," "Y_BL_M," and "Y_BL_L" when the size of the facial region is "large" and weights for the high, medium, and low frequency bands are given by parameters "Y_BS_H," "Y_BS_M," and "Y_BS_L" when the size of the facial region is "small." In this case, weights "Y_BX_H," "Y_BX_M," and "Y_BX_L" for the high, medium, and low frequency bands are calculated using respective linear interpolation formulas as follows.

Parameter for High Frequency Band:

$$Y\_BX\_H = (Y\_BL\_H - Y\_BS\_H) \times \frac{X-S}{L-S}$$

Parameter for Medium Frequency Band:

$$Y\_BX\_M = (Y\_BL\_M - Y\_BS\_M) \times \frac{X-S}{L-S}$$

Parameter for Low Frequency Band:

$$Y\_BX\_L = (Y\_BL\_L - Y\_BS\_L) \times \frac{X-S}{L-S}$$

where:

L denotes a pixel size of the facial region determined to be large (equal to or larger than ⅞ of the entire image);

S denotes a pixel size of the facial region determined to be small (smaller than ⅛ of the entire image); and X denotes a pixel size of the facial region determined to be medium.

Thus, appropriate noise reduction can be applied to the luminance signal Y according to frequency bands even when the size of the face is medium, making it possible, when the size of the face is neither large nor small, to avoid using inappropriate parameters for noise reduction, which could result in a phenomenon known as hunting.

Sixth Embodiment

Figure 26:
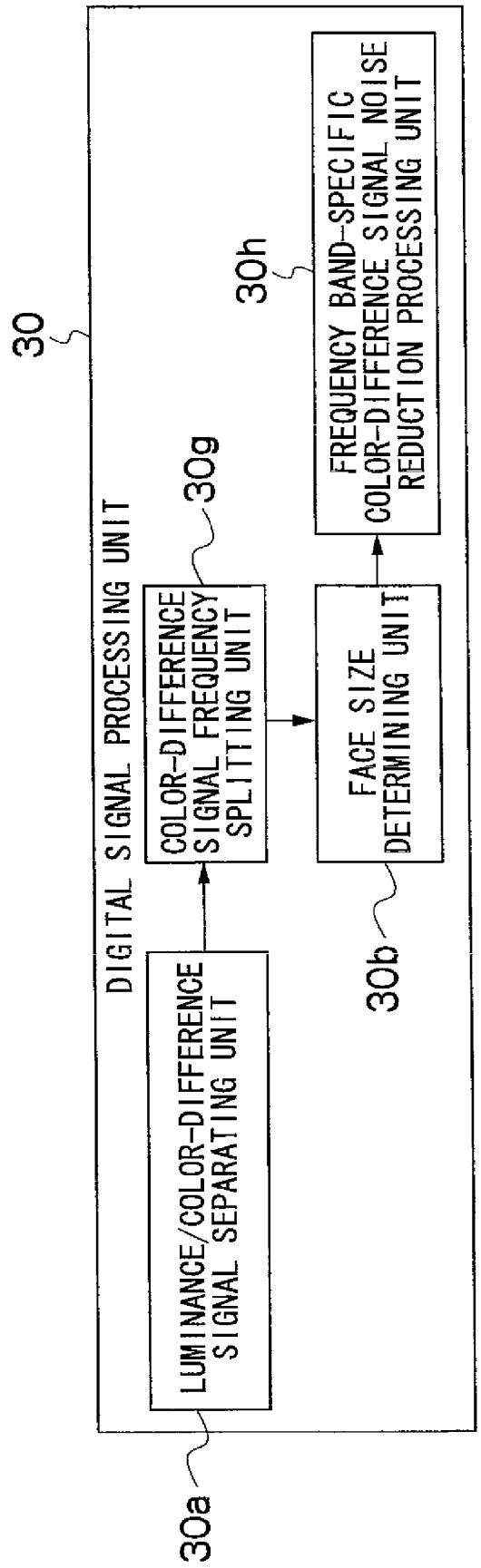
FIG. 26 is a block diagram showing a digital signal processing unit according to a sixth embodiment.

FIG. 26 shows a detailed configuration of the digital signal processing unit 30 in the digital camera 10 according to a sixth embodiment.

As shown in FIG. 26, the digital signal processing unit 30 according to the sixth embodiment includes: luminance/color-difference signal separating unit 30a; face size determining unit 30b; color-difference signal frequency splitting unit 30g; and frequency band-specific color-difference signal noise reduction processing unit 30h. The same components as those in the other embodiments are designated by the same reference numerals as the corresponding components in the other embodiments.

In the fifth embodiment, a luminance signal is used for the skin tone improvement process. On the other hand, in the sixth embodiment, a color-difference signal is used for the skin tone improvement process in stead of the luminance signal.

Figure 27:
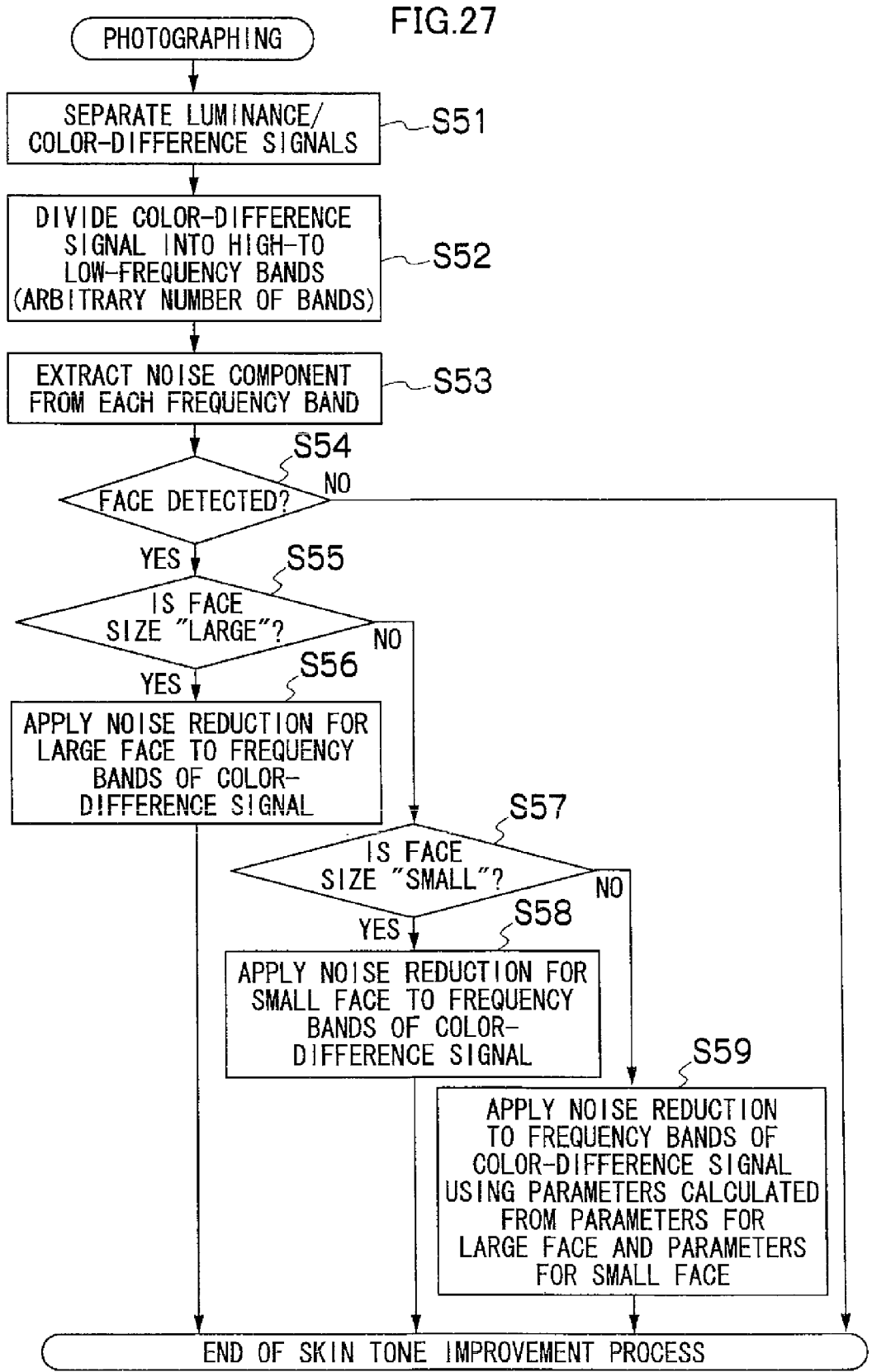
FIG. 27 is a flowchart of a skin tone improvement process according to the sixth embodiment.

FIG. 27 illustrates a flow of a skin tone improvement process performed by the digital camera 10 according to the sixth embodiment.

S51 to S54 are the same as S31 to S34.

In S55, it is determined whether a facial region is "large" or not FIG. 28 shows an example of a face size determination table in which the determination criteria are prescribed according to a ratio of a horizontal width of a facial region to that of an entire image. For example, the facial region is determined to be large according to a face size determination table in FIG. 28 if a ratio of a horizontal width of the facial region to that of the entire image is equal to or larger than ⅞. If it is determined that the facial region is large, the flow goes to S56.

In S56, the frequency band-specific color-difference signal noise reduction processing unit 30h determines weights for frequency bands of the color-difference signal C according to rules used when the size of the facial region is "large" and performs a noise reduction process on the frequency bands according to the determined weights. FIG. 29 shows an example of a weight table which prescribes weights according to a size of a facial region. In S56, weights used when the size of the facial region is "large" are assigned: specifically, "large" weights are assigned to all the high, medium, and low frequency bands. This is the same as in S36.

In S57, it is determined whether the size of the facial region is "small" or not. For example, if the width of the facial region is smaller than ⅛ the horizontal pixel width of the entire screen, it is determined based on the face size determination table in FIG. 28 that the facial region is small, and the flow goes to S58. Otherwise, the flow goes to S59.

In S58, the frequency band-specific color-difference signal noise reduction processing unit 30h determines weights for frequency bands of the color-difference signal C according to rules used when the size of the facial region is "small" and performs a noise reduction process on the frequency bands according to the determined weights.

FIG. 29 shows an example of a weight table which prescribes weights according to the size of the facial region. In S58, weights used when the size of the facial region is "small" are assigned: specifically, a "large" weight is assigned to the high frequency band, a "medium" weight is assigned to the medium frequency band, and a "small" weight is assigned to the low frequency band. This is the same as in S37.

In S59, weights assigned to the frequency bands when the size of the facial region is "medium" (that is, the size of the facial region is intermediate between the threshold for "larger" and the threshold for "small") are determined by linear interpolation from the weights assigned to the frequency bands when the size of the facial region is "large" and the weights assigned to the frequency bands when the size of the facial region is "small."

For example, FIG. 30 generally shows parameters used for such linear interpolation, where weights for the high, medium, and low frequency bands of the color-difference signal C are given by parameters "C_BL_H," "C_BL_M" and "C_BL_L" when the size of the facial region is "large" and weights for the high, medium, and low frequency bands are given by parameters "C_BS_H," "C_BS_M," and "C_BS_S_L" when the size of the facial region is "small." In this case, weights "C_BX_H," "C_BX_M," and "C_BX_L" for the high, medium, and low frequency bands are calculated using respective linear interpolation formulas as follows.

Parameter for High Frequency Band:

$$C\_BX\_H = (C\_BL\_H - C\_BS\_H) \times \frac{X - S}{L - S}$$

Parameter for Medium Frequency Band:

$$C\_BX\_M = (C\_BL\_M - C\_BS\_M) \times \frac{X - S}{L - S}$$

Parameter for Low Frequency Band:

$$C\_BX\_L = (C\_BL\_L - C\_BS\_L) \times \frac{X - S}{L - S}$$

where:

L denotes a pixel size of the facial region determined to be large (equal to or larger than ⅞ of the entire image);

S denotes a pixel size of the facial region determined to be small (smaller than ⅛ of the entire image); and X denotes a pixel size of the facial region determined to be medium.

Thus, appropriate noise reduction can be applied to the color-difference signal C according to frequency bands even when the size of the face is medium, making it possible, when the size of the face is neither large nor small, to avoid the use of inappropriate parameters for noise reduction, which could result in a phenomenon known as hunting.

While embodiments of the present invention have been explained in detail, the present invention is not limited to the above examples, and, needless to say, various improvements and modifications may be added without departing from the scope of the present invention.

For example, in the fifth and sixth embodiments, weights for large face and small face are given for each of frequency bands, a luminance signal or a color-difference signal is divided according to the frequency bands, and noise reduction process is applied to each signal using one of the weight for a large face, the weight for a small face or an interpolated weight for a medium size face, depending on a size of a facial region. However, in a modified embodiment, weights for large face and small face may be given for only high-frequency band. And, a high-frequency component is extracted from a luminance signal or a color-difference signal, and the noise reduction process is applied to the extracted high-frequency component of the signal using any one of a weight for a large face, a weight for a small face or an interpolated weight for a medium size face depending on a size of a facial region included in an original image.

What is claimed is:

1. An image processing method comprising the steps of:
  inputting an image;
  detecting a facial region in the image;
  determining multiple frequency bands in which a luminance signal of the image will be subjected to a predetermined noise reduction process based on a size of the detected facial region;
  extracting the determined frequency bands from the luminance signal of the image; and
  performing the predetermined noise reduction process on the frequency bands extracted from the luminance signal of the image,
  wherein the multiple frequency bands comprise high, middle, and low frequencies.

2. A non-transitory computer-readable recording medium on which an image processing program for causing a computer to perform the image processing method according to claim 1 has been recorded.

3. The image processing method according to claim 1, wherein the predetermined noise reduction process comprises a coring process.

4. An image processing method comprising the steps of:
  inputting an image;
  detecting a facial region in the image;
  determining multiple frequency bands in which a color-difference signal of the image will be subjected to a predetermined noise reduction process based on a size of the detected facial region;
  extracting the determined frequency bands from the color-difference signal of the image; and
  performing the predetermined noise reduction process on the frequency bands extracted from the color-difference signal of the image,
  wherein the multiple frequency bands comprise high, middle, and low frequencies.

5. A non-transitory computer-readable recording medium on which an image processing program for causing a computer to perform the image processing method according to claim 4 has been recorded.

6. The image processing method according to claim 4, wherein the predetermined noise reduction process comprises a coring process.

7. An image processing method comprising the steps of:
  inputting an image;
  separating a luminance signal of the image into a plurality of frequency components according to a plurality of predetermined frequency bands;
  detecting a facial region in the image;
  determining a weight for each of the separated frequency components to be subjected to a noise reduction process based on a size of the detected facial region; and
  performing a predetermined noise reduction process on each of the separated frequency components based on the determined weight for each of the separated frequency components
  wherein the plurality of frequency bands comprise high, middle, and low frequencies.

8. The image processing method according to claim 7, wherein when the size of the facial region is an intermediate size between a first size and a second size, a weight for the face of the intermediate size is determined by linear interpolation from weights of the first size and the second size.

9. A non-transitory computer-readable recording medium on which an image processing program for causing a computer to perform the image processing method according to claim 7 has been recorded.

10. The image processing method according to claim 7, wherein the predetermined noise reduction process comprises a coring process.

11. An image processing method comprising the steps of:
inputting an image;
separating a color-difference signal of the image into a plurality of frequency components according to a plurality of predetermined frequency bands;
detecting a facial region in the image;
determining a weight for each of the separated frequency components to be subjected to a noise reduction process based on a size of the detected facial region; and
performing a predetermined noise reduction process on each of the separated frequency components based on the determined weight for each of the separated frequency components,
wherein the plurality of frequency bands comprise high, middle, and low frequencies.

12. The image processing method according to claim 11, wherein when the size of the facial region is an intermediate size between a first size and a second size, a weight for the face of the intermediate size is determined by linear interpolation from weights of the first size and the second size.

13. A non-transitory computer-readable recording medium on which an image processing program for causing a computer to perform the image processing method according to claim 11 has been recorded.

14. The image processing method according to claim 11, wherein the predetermined noise reduction process comprises a coring process.

15. An image processing apparatus comprising:
an image input unit which inputs an image;
a face detecting unit which detects a facial region in the image;
a frequency band determining unit which determines multiple frequency bands in which a luminance signal of the image will be subjected to a predetermined noise reduction process based on a size of the detected facial region;
a frequency band extracting unit which extracts the determined frequency bands from the luminance signal of the image; and
a noise reduction processing unit which performs the predetermined noise reduction process on the frequency bands extracted from the luminance signal of the image,
wherein the multiple frequency bands comprise high, middle, and low frequencies.

16. An image pickup apparatus comprising:
the image processing apparatus according to claim 15;
an image pickup element which receives a subject image via a photographic optical system and outputs an analog image signal that represents the subject image; and
an image output unit which converts the analog image signal into a digital image data and outputs the digital image data to the image input unit.

17. The image processing apparatus according to claim 15, wherein the predetermined noise reduction process comprises a coring process.

18. An image processing apparatus comprising:
an image input unit which inputs an image;
a face detecting unit which detects a facial region in the image;
a frequency band determining unit which determines multiple frequency bands in which a color-difference signal of the image will be subjected to a predetermined noise reduction process based on a size of the detected facial region;
a frequency band extracting unit which extracts the determined frequency bands from the color-difference signal of the image; and
a noise reduction processing unit which performs the predetermined noise reduction process on the frequency bands extracted from the color-difference signal of the image,
wherein the multiple frequency bands comprise high, middle, and low frequencies.

19. An image pickup apparatus comprising:
the image processing apparatus according to claim 18;
an image pickup element which receives a subject image via a photographic optical system and outputs an analog image signal that represents the subject image; and
an image output unit which converts the analog image signal into a digital image data and outputs the digital image data to the image input unit.

20. The image processing apparatus according to claim 18, wherein the predetermined noise reduction process comprises a coring process.

21. An image processing apparatus comprising:
an image input unit which inputs an image;
a separation unit which separates a luminance signal of the image into a plurality of frequency components according to a plurality of predetermined frequency bands;
a face detecting unit which detects a facial region in the image;
a weight determining unit which determines a weight for each of the separated frequency components to be subjected to a noise reduction process based on a size of the detected facial region; and
a noise reduction processing unit which performs a predetermined noise reduction process on each of the separated frequency components based on the determined weight for each of the separated frequency components,
wherein the multiple frequency bands comprise high, middle, and low frequencies.

22. An image pickup apparatus comprising:
the image processing apparatus according to claim 21;
an image pickup element which receives a subject image via a photographic optical system and outputs an analog image signal that represents the subject image;
and an image output unit which converts the analog image signal into a digital image data and outputs the digital image data to the image input unit.

23. The image processing apparatus according to claim 21, wherein the predetermined noise reduction process comprises a coring process.

24. An image processing apparatus comprising:
an image input unit which inputs an image;
a separation unit which separates a color-difference signal of the image into a plurality of frequency components according to a plurality of predetermined frequency bands;
a face detecting unit which detects a facial region in the image;
a weight determining unit which determines a weight for each of the separated frequency components to be subjected to a noise reduction process based on a size of the detected facial region; and
a noise reduction processing unit which performs a predetermined noise reduction process on each of the separated frequency components based on the determined weight for each of the separated frequency components,
wherein the multiple frequency bands comprise high, middle, and low frequencies.

25. An image pickup apparatus comprising:
the image processing apparatus according to claim 24;
an image pickup element which receives a subject image via a photographic optical system and outputs an analog image signal that represents the subject image; and
an image output unit which converts the analog image signal into a digital image data and outputs the digital image data to the image input unit.

26. The image processing apparatus according to claim 24, wherein the predetermined noise reduction process comprises a coring process.

* * * * *